US012645322B2

(12) United States Patent
Jung et al.

(10) Patent No.: US 12,645,322 B2
(45) Date of Patent: Jun. 2, 2026

(54) DISPLAY DEVICE, METHOD FOR DRIVING THE SAME, AND ELECTRONIC DEVICE INCLUDING THE SAME

(71) Applicant: Samsung Display Co., LTD., Yongin-si (KR)

(72) Inventors: Keum Dong Jung, Yongin-si (KR); Jang Hui Kim, Yongin-si (KR); Ji Hoon Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/955,589

(22) Filed: Nov. 21, 2024

(65) Prior Publication Data

US 2025/0377750 A1      Dec. 11, 2025

(30) Foreign Application Priority Data

Jun. 11, 2024     (KR) ........................ 10-2024-0075781

(51) Int. Cl.
*G06F 3/041* (2006.01)

(52) U.S. Cl.
CPC ...... *G06F 3/04166* (2019.05); *G06F 3/04162* (2019.05)

(58) Field of Classification Search
CPC .......................... G06F 3/04166; G06F 3/04162
See application file for complete search history.

(56) References Cited

U.S. PATENT DOCUMENTS

| 9,159,284 B2 | 10/2015 | Park et al. | |
| 9,329,708 B2 | 5/2016 | Westhues | |
| 9,606,646 B2 | 3/2017 | Westhues | |
| 9,916,022 B2 | 3/2018 | Westhues | |
| 9,927,909 B2 | 3/2018 | Westhues et al. | |
| 10,817,083 B2 | 10/2020 | Gur et al. | |
| 2019/0179475 A1* | 6/2019 | Seo ...................... | G06F 3/0442 |
| 2023/0236677 A1* | 7/2023 | Cheng ................... | G06F 3/0441 |
| | | | 345/179 |
| 2024/0160317 A1* | 5/2024 | Jang ...................... | G06F 3/0441 |

FOREIGN PATENT DOCUMENTS

KR      10-2024-0160712 A      11/2024

* cited by examiner

*Primary Examiner* — Jonathan A Boyd
(74) *Attorney, Agent, or Firm* — Womble Bond Dickinson (US) LLP

(57) ABSTRACT

A display device includes: a touch array including a plurality of touch electrodes; and a touch driver configured to sense a touch approaching the touch array, wherein the touch driver is configured to generate uplink signals and beacon signals through at least some of the touch electrodes in a first time period, to transmit generated uplink signals and beacon signals to an external device, and to receive position information of the external device above the touch array, which is calculated by the external device, from the external device using the uplink signals in a second time period after the first time period, and wherein a range of the run length of the uplink signals and a range of the run length of the beacon signals are distinct from each other.

17 Claims, 19 Drawing Sheets

TX: TX1~TXq
RX: RX1~RXp

DL: DL1~DLm
SL: SL1~SLn

1000

DISPLAY DEVICE, METHOD FOR DRIVING THE SAME, AND ELECTRONIC DEVICE INCLUDING THE SAME

CROSS-REFERENCE TO RELATED APPLICATION

The present application claims priority to and the benefit of Korean Patent Application No. 10-2024-0075781, filed on Jun. 11, 2024, in the Korean Intellectual Property Office, the entire disclosure of which is incorporated herein by reference.

BACKGROUND

1. Field

Aspects of some embodiments of the present disclosure relate to a display device, method for driving the same, and electronic device including the same.

2. Description of the Related Art

An electronic device equipped with a touch panel and having the ability to indicate a location by touching is widely used. For example, a touch panel may be used as mobile electronic devices such as a smartphone and a tablet computer become widespread. In recent years, there has been an increasing demand for technology that recognizes touch on a touch panel using tools such as an active pen as well as fingers.

There are cases where touch position information of an object positioned above a display may be desired. The user's location and coordinate information can be obtained from signals transmitted by satellites, or the location of people inside a building can be identified mainly through indoor positioning technology. However, it may be difficult to obtain accurate touch position information above the display using these conventional technologies.

The above information disclosed in this Background section is only for enhancement of understanding of the background and therefore the information discussed in this Background section does not necessarily constitute prior art.

SUMMARY

Aspects of some embodiments of the present invention include a display device and a method of driving the same that may be capable of efficiently and effectively obtaining position information of an external device positioned above a display.

A display device according to some embodiments of the present invention may include a touch array including a plurality of touch electrodes; and a touch driver sensing a touch approaching the touch array. According to some embodiments, the touch driver may generate uplink signals and beacon signals through at least some of the touch electrodes in a first time period, transmit generated uplink signals and beacon signals to an external device, and receive position information of the external device above the touch array, which is calculated by the external device, from the external device using the uplink signals in a second time period after the first time period. According to some embodiments, a range of the run length of the uplink signals and a range of the run length of the beacon signals may be distinct from each other.

According to some embodiments, the touch driver may generate the uplink signals so that a maximum run length is N, and generate the beacon signals so that the run length is N+1 or more, where N may be an integer greater than or equal to 1.

According to some embodiments, in the first time period, the touch driver may transmit the uplink signals to the external device after transmitting the beacon signals to the external device.

According to some embodiments, the touch driver may apply the beacon signals of the same waveform to each of the touch electrodes and apply the uplink signals of different waveforms to each of the touch electrodes.

According to some embodiments, the uplink signals may have an electrical pulse form including a digital component representing positional information of the touch electrodes.

According to some embodiments, the beacon signals may have an electrical pulse form including panel information and information for drive synchronization between the touch array and the external device.

According to some embodiments, the touch driver may receive the position information of the external device as a downlink signal through at least some of the touch electrodes, and decode the downlink signal to generate the position information of the external device.

According to some embodiments, the external device may be an active pen, and the downlink signal may further include at least one of button status information of the active pen, tilt information of the active pen, or battery status information of the active pen.

According to some embodiments, the touch driver may be configured to communicate with a host, and the touch driver may transmit the position information of the external device to the host.

According to some embodiments of the present disclosure, a method of driving a display panel including a touch array includes: sensing a touch approaching the touch array; generating uplink signals and beacon signals in a first time period and transmitting generated uplink signals and beacon signals to an external device through touch electrodes of the touch array; and receiving position information of the external device above the touch array from the external device using the uplink signals in a second time period after the first time period, the position information of the external device being calculated by the external device. According to some embodiments, a range of the run length of the uplink signals and a range of the run length of the beacon signals may be distinct from each other.

According to some embodiments, the uplink signals may be generated so that a maximum run length is N, and the beacon signals may be generated so that the run length is N+1 or more, where N may be an integer greater than or equal to 1.

According to some embodiments, in the transmitting the generated uplink signals and beacon signals to the external device through the touch electrodes, after the beacon signals are transmitted to the external device, the uplink signals may be transmitted to the external device.

According to some embodiments, in the transmitting the generated uplink signals and beacon signals to the external device through the touch electrodes, the beacon signals of the same waveform may be applied to each of the touch electrodes, and the uplink signals of different waveforms may be applied to each of the touch electrodes.

According to some embodiments, the uplink signals may have an electrical pulse form including a digital component representing positional information of the touch electrodes.

According to some embodiments, the beacon signals may have an electrical pulse form including panel information and information for drive synchronization between the touch array and the external device.

According to some embodiments, the receiving the position information may include receiving the position information of the external device as a downlink signal through at least some of the touch electrodes; and decoding the downlink signal to obtain the position information of the external device.

According to some embodiments, the external device may be an active pen, and the downlink signal may further include at least one of button status information of the active pen, tilt information of the active pen, or battery status information of the active pen.

According to some embodiments, the method of driving the display panel may further include transmitting the position information of the external device to a host.

An electronic device includes a processor to provide input image data; and a display device to display an image based on the input image data, the display device including sub-pixel areas. The display device includes a display layer including a light emitting element disposed in the sub-pixel areas and a sensor layer including conductive pattern layers including a first conductive pattern layer and a second conductive pattern layer that are disposed in different layers from one another. The sensor layer includes an overlapped area where the first conductive pattern layer and the second conductive pattern layer overlap each other, a non-overlapped area where either the first conductive pattern layer or the second conductive pattern, but not both, is disposed, and a cutting area where the first conductive pattern layer and/or the second conductive pattern is cut. The conductive pattern layers include a non-overlapped identification pattern portion disposed in the non-overlapped area, and an overlapped identification pattern portion disposed in the overlapped area.

BRIEF DESCRIPTION OF THE DRAWINGS

The accompanying drawings, which are included to provide a further understanding of embodiments according to the present disclosure, and are incorporated in and constitute a part of this specification, illustrate aspects of some embodiments of the present disclosure, and, together with the description, serve to explain aspects of some embodiments of the present disclosure.

DETAILED DESCRIPTION

Figure 1:
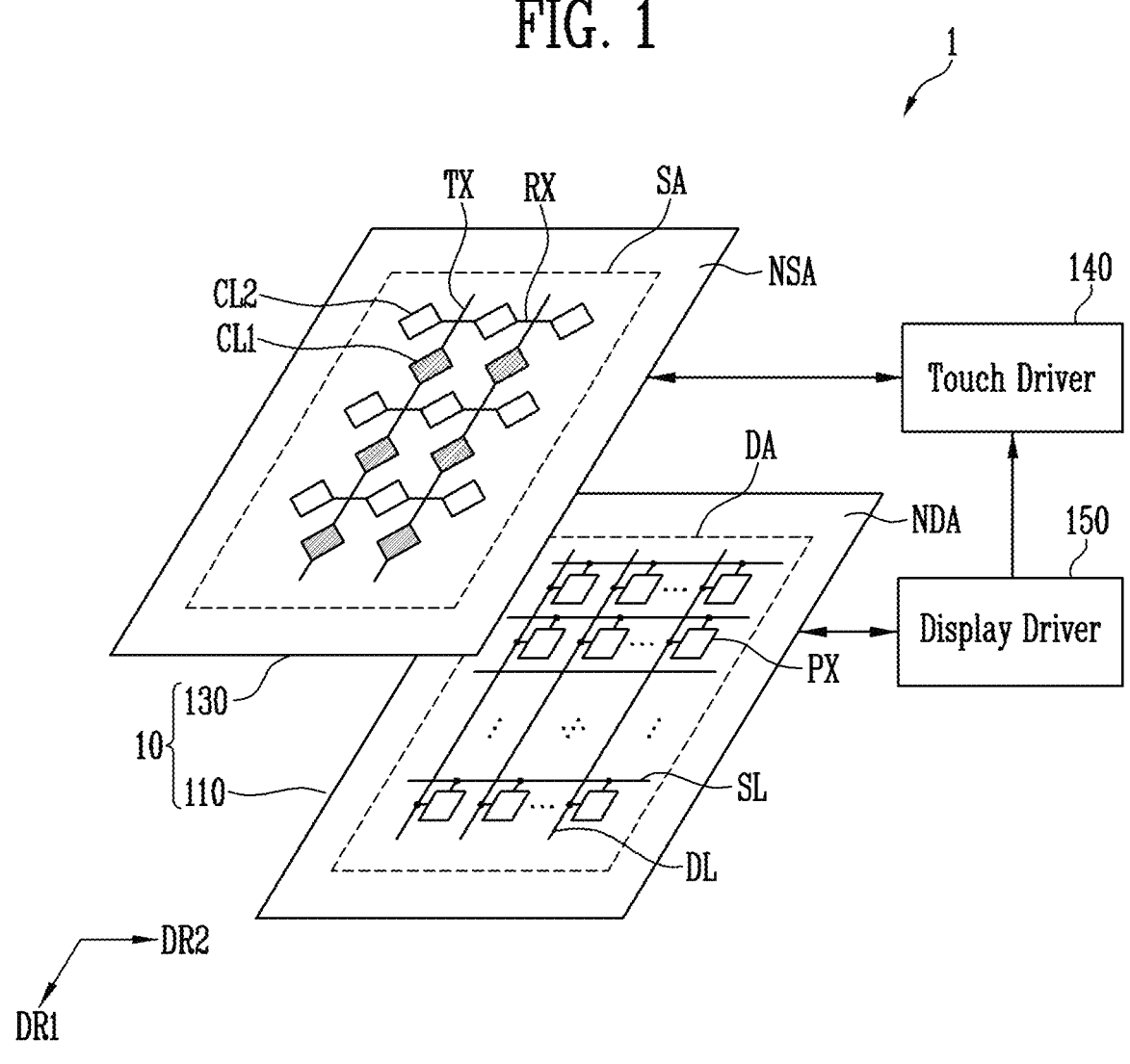
FIG. 1 is a block diagram illustrating a display device according to some embodiments of the present invention.

Hereinafter, aspects of some embodiments of the present disclosure will be described in more detail with reference to the accompanying drawings. It should be noted that in the following description, only the parts necessary to understand the operation according to the present invention will be described, and descriptions of other parts will be omitted in order to not obscure the gist of the present invention. In addition, the present invention is not limited to the embodiments described herein and may be embodied in other forms. The embodiments described herein are provided merely to explain in more detail enough to enable those skilled in the art to make, use, and understand aspects of embodiments according to the present disclosure.

Throughout the specification, in a case where a portion is "connected" to another portion, the case includes not only a case where the portion is "directly connected" but also a case where the portion is "indirectly connected" with another element interposed therebetween. Terms used herein are for describing specific embodiments and are not intended to limit the present invention. Throughout the specification, in a case where a certain portion "includes", the case means that the portion may further include another component without excluding another component unless otherwise stated. "At least any one of X, Y, and Z" and "at least any one selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Here, terms such as first and second may be used to describe various components, but these components are not limited to these terms. These terms are used to distinguish one component from another component. Therefore, a first component may refer to a second component within a range without departing from the scope disclosed herein.

Spatially relative terms such as "under", "on", and the like may be used for descriptive purposes, thereby describing the relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features are positioned in a direction "on" the other elements or features. Therefore, according to some embodiments, the term "under" may include both directions of on and under. In addition, the device may face in other directions (for example, rotated 90 degrees or in other directions) and thus the spatially relative terms used herein are interpreted according thereto.

Various embodiments are described with reference to drawings schematically illustrating ideal embodiments. Accordingly, it will be expected that shapes may vary, for example, according to tolerances and/or manufacturing techniques. Therefore, the embodiments disclosed herein cannot be construed as being limited to shown specific shapes, and should be interpreted as including, for example, changes in shapes that occur as a result of manufacturing. As described above, the shapes shown in the drawings may not show actual shapes of areas of a device, and the present embodiments are not limited thereto.

FIG. 1 is a block diagram illustrating a display device according to some embodiments of the present invention.

Referring to FIG. 1, a display device 1 may include a panel 10, a touch driver 140, and a display driver 150.

The panel 10 may include a display panel 110 and a touch array 130 overlapping the display panel 110.

According to some embodiments, the display panel 110 and the touch array 130 may be manufactured separately and then combined to at least partially overlap each other. According to some embodiments, the display panel 110 and the touch array 130 may be manufactured integrally. In this case, the touch array 130 may be formed directly on at least one layer constituting the display panel 110, for example, an upper substrate, a thin film encapsulation layer, or an insulating layer of the display panel 110.

In FIG. 1, the touch array 130 is shown as being located above the display panel 110, but the touch array 130 is not limited thereto. For example, the touch array 130 may be located below the display panel 110.

The display panel 110 may include a display area DA for displaying an image and a non-display area NDA around (e.g., in a periphery or outside a footprint of) the display area DA. The non-display area NDA may at least partially surround the display area DA. The display panel 110 may include pixels PX formed on a substrate. The pixels PX may be located in the display area DA. According to some embodiments, the substrate may be a rigid substrate including a material such as glass or tempered glass. According to some embodiments, the substrate may be a flexible substrate including a material such as plastic or metal.

The pixels PX may be connected to driving lines SL and data lines DL. The pixels PX may be selected by a driving signal of a turn-on level supplied through the driving lines SL and receive data signals through the data lines DL. Accordingly, the pixels PX may emit light of luminances corresponding to the data signals, and an image may be displayed in the display area DA.

Wirings and/or built-in circuits connected to the pixels PX may be located in the non-display area NDA. For example, a scan driver may be further located in the non-display area NDA.

According to some embodiments, the display panel 110 may include the pixels PX such as organic light emitting diodes, inorganic light emitting diodes, or quantum dot/well light emitting diodes. According to some embodiments, the display panel 110 may be implemented as a liquid crystal display panel. In this case, the display device 1 may further include a light source such as a back-light unit.

The touch array 130 may include an active area SA capable of sensing a touch and a non-active area NSA around the active area SA. The active area SA may at least partially overlap the display area DA.

The touch array 130 may include a substrate and touch electrodes formed on the substrate. According to some embodiments, touch electrodes SC (see FIG. 2) may include driving electrodes TX and sensing electrodes RX. The driving electrodes TX and the sensing electrodes RX may be located in the active area SA on the substrate. According to some embodiments, the substrate may be a rigid substrate including a material such as glass or tempered glass. According to some embodiments, the substrate may be a flexible substrate including a material such as plastic or metal. According to some embodiments, at least one layer constituting the display panel 110 may be used as the substrate of the touch array 130.

The driving electrodes TX may include first cells CL1 arranged in a first direction DR1 and electrically connected to each other. The sensing electrodes RX may include second cells CL2 arranged in a second direction DR2 and electrically connected to each other.

According to some embodiments, the display driver 150 and the touch driver 140 may be configured as separate ICs (integrated circuit chips). According to some embodiments, the display driver 150 and the touch driver 140 may be mounted in a single IC.

The display driver 150 may be electrically connected to the display panel 110 and may drive the pixels PX. For example, the display driver 150 may include a data driver connected to the data lines DL, a scan driver connected to the driving lines SL, and a timing controller that controls the data driver and the scan driver. As another example, the display driver 150 may include the data driver and the timing controller, and the scan driver may be located in the non-display area NDA of the display panel 110.

The touch driver 140 may be connected to the touch array 130 and may drive the touch array 130 using a driving signal.

The display driver 150 may display an image on the display panel 110 in units of display frames. The touch driver 140 may sense a touch in units of sensing frames. A sensing frame period and a display frame period may be synchronized or asynchronous with each other.

Figure 2:
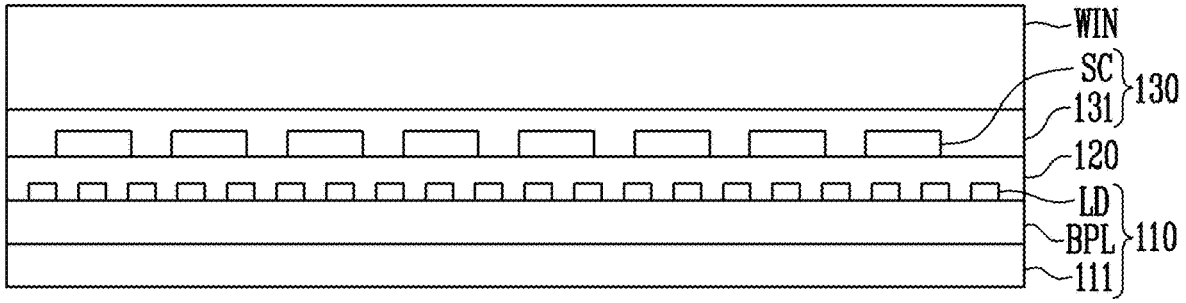
FIG. 2 is a cross-sectional view illustrating aspects of the display device of FIG. 1 according to some embodiments.

FIG. 2 is a cross-sectional view illustrating aspects of the display device of FIG. 1 according to some embodiments.

Referring to FIG. 2, the touch array 130 may be laminated on the display panel 110, and a window WIN may be laminated on the touch array 130.

The display panel 110 may include a display substrate 111, a circuit element layer BPL formed on the display substrate 111, and light emitting elements LD formed on the circuit element layer BPL. The circuit element layer BPL may include pixel circuits (for example, transistors and capacitors) for driving the light emitting elements LD of the pixels PX, scan lines, data lines, and the like.

An encapsulation film 120 covering the light emitting elements LD may be further provided. According to some embodiments, the encapsulation film 120 may include at least one inorganic film and at least one organic film, and according to this configuration, the encapsulation film 120 may protect the light emitting elements LD from an external environment.

The touch array 130 may include the touch electrodes SC formed on the display panel 110 and a protective film 131 covering the touch electrodes SC. The touch electrodes SC may be provided as the driving electrodes TX and the sensing electrodes RX of FIG. 1. The encapsulation film 120 may function as a sensor substrate supporting the touch array 130. According to some embodiments, a separate sensor substrate supporting the touch array 130 may be provided separately from the encapsulation film 120.

The window WIN may be a protective member located at the top of a module of the display device 1, and may be a transparent (or substantially transparent), light-transmitting substrate. The window WIN may have a multilayer structure selected from a glass substrate, a plastic film, and a plastic substrate. The window WIN may include a rigid or flexible substrate, and the material constituting the window WIN is not particularly limited.

According to some embodiments, the display device 1 may further include a polarizing plate (or another type of anti-reflection layer) located between the window WIN and the touch array 130 to prevent or reduce reflection of external light.

Figure 3:
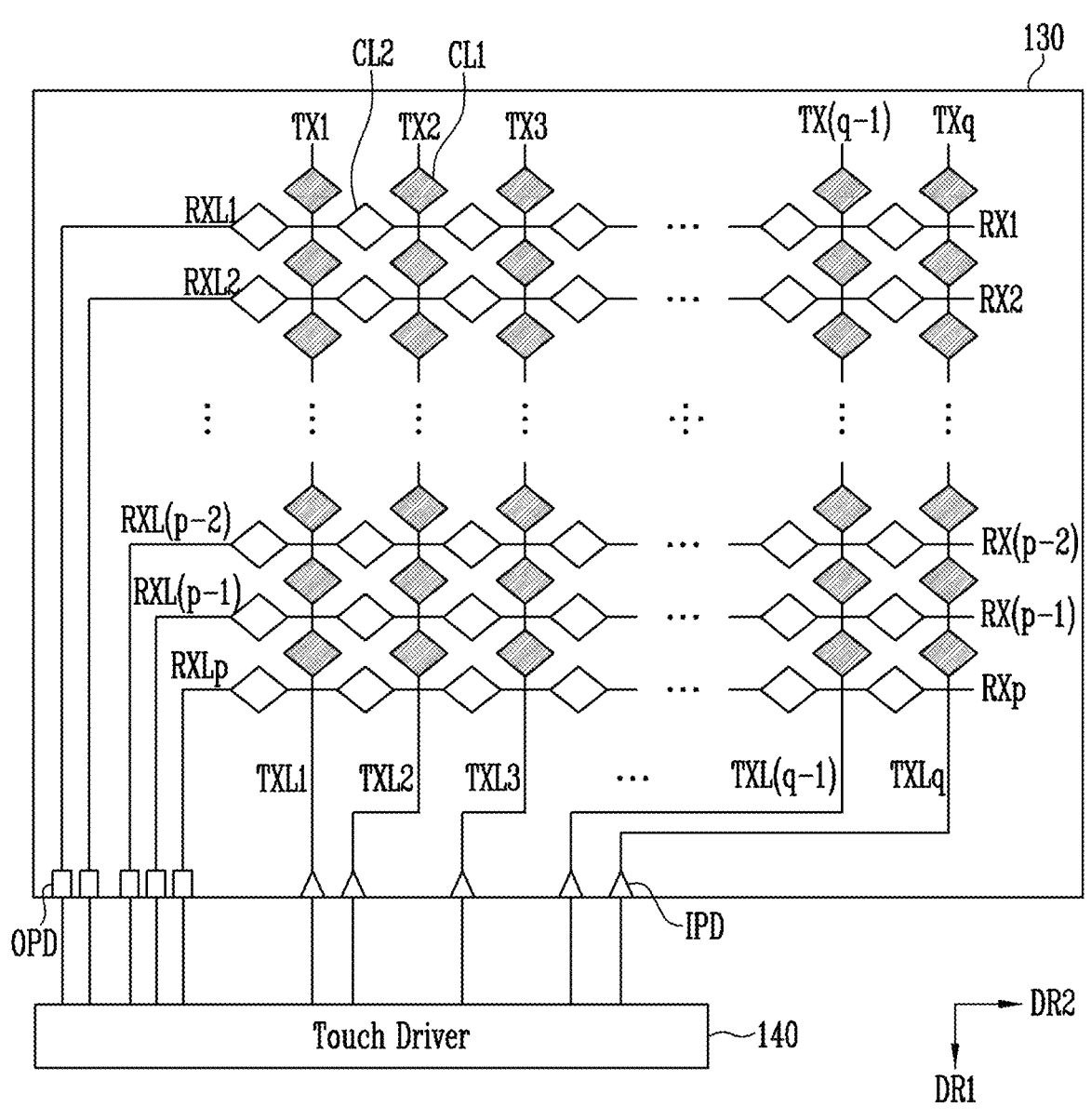
FIG. 3 is a block diagram illustrating aspects of a touch array and a touch driver of FIG. 1 according to some embodiments.

FIG. 3 is a block diagram illustrating aspects of a touch array and a touch driver of FIG. 1 according to some embodiments.

Referring to FIG. 3, the touch array 300 may include the driving electrodes TX and the sensing electrodes RX. The driving electrodes TX may include first to q-th driving electrodes TX1 to TXq. The sensing electrodes RX may include first to p-th sensing electrodes RX1 to RXp, where p and q may be positive integers. The first to q-th driving electrodes TX1 to TXq may be connected to first to q-th driving lines TXL1 to TXLq, respectively. The first to p-th sensing electrodes RX1 to RXp may be connected to first to p-th sensing lines RXL1 to RXLp, respectively.

The first to q-th driving electrodes TX1 to TXq may include the first cells CL1 arranged in the first direction DR1 and electrically connected to each other. The first to p-th sensing electrodes RX1 to RXp may include the second cells CL2 arranged in the second direction DR1 and electrically connected to each other. In FIG. 3, the first cells CL1 and the second cells CL2 are shown as having a diamond shape. However, embodiments of the present invention are not limited thereto. For example, the first cells CL1 and the second cells CL2 may have at least one of various shapes, such as a circle, a square, a triangle, or a mesh shape. In addition, the first cells CL1 and the second cells CL2 may be formed as a single layer or multiple layers. In this way, the shapes and arrangements of the first to q-th driving electrodes TX1 to TXq and the first to p-th sensing electrodes RX1 to RXp may be variously modified.

According to some embodiments, the first cells CL1 and the second cells CL2 may be conductive by including at least one of various conductive materials, such as a metal material or a transparent conductive material. For example, the first cells CL1 and the second cells CL2 may include at least one of various metal materials, such as gold (Au), silver (Ag), aluminum (Al), molybdenum (Mo), chromium (Cr), titanium (Ti), nickel (Ni), neodymium (Nd), copper (Cu), or platinum (Pt), or an alloy thereof.

The touch array 130 may further include input pads IPD connected to the first to q-th driving lines TXL1 to TXLq. The touch driver 140 may be connected to the first to q-th driving lines TXL1 to TXLq through the input pads IPD.

The touch array 300 may further include output pads OPD connected to the first to p-th sensing lines RXL1 to RXLp.

The touch driver 140 may be connected to the first to p-th sensing lines RXL1 to RXLp through the output pads OPD.

The touch array 130 may include first touch electrodes and second touch electrodes forming mutual capacitances with the first touch electrodes. The first touch electrodes may be provided as the first to q-th driving electrodes TX1, TX2, TX3, . . . TX(q−1), and TXq. The second touch electrodes may be provided as first to p-th sensing electrodes RX1, RX2, . . . RX(p−2), RX(p−1), and RXp. The first to q-th driving electrodes TX1 to TXq may be arranged to extend in the first direction DR1 and be spaced apart from each other in the second direction DR2. The first to p-th sensing electrodes RX1 to RXp may be arranged to extend in the second direction DR2 and be spaced apart from each other in the first direction DR1. The first to p-th sensing electrodes RX1 to RXp may intersect the first to q-th driving electrodes TX1 to TXq and be electrically separated from the first to q-th driving electrodes TX1 to TXq to form mutual capacitances with the first to q-th driving electrodes TX1 to TXq.

When a touch is applied to the touch array 130, one or more of the mutual capacitances may change. For example, the touch may include at least one of various types of inputs that cause a change in mutual capacitance, such as physical contact, hovering, or the like. The touch driver 140 may sense such a change in mutual capacitance to recognize the touch.

The touch driver 140 may be connected to the first to q-th driving electrodes TX1 to TXq through the first to q-th driving lines TXL1 to TXLq. The touch driver 140 may be connected to the first to p-th sensing electrodes RX1 to RXp through the first to p-th sensing lines RXL1 to RXLp.

The touch driver 140 may apply driving signals to the first to q-th driving electrodes TX1 to TXq through the first to q-th driving lines TXL1 to TXLq, and sense sensing signals from the first to p-th sensing electrodes RX1 to RXp through the first to p-th sensing lines RXL1 to RXlp. The touch driver 140 may sense a change in mutual capacitance based on the sensing signals.

The display device 1 of FIG. 1 may communicate signals with an external device through the first to q-th driving electrodes TX1 to TXq and the first to p-th sensing electrodes RX1 to RXp. For example, the touch driver 140 may output beacon signals and uplink signals through the first to q-th driving electrodes TX1 to TXq and the first to p-th sensing electrodes RX1 to RXp. The external device may receive (or acquire) at least some of the uplink signals when the external device approaches the touch array 130. The external device may receive (or acquire) the beacon signals when the external device approaches the touch array 130.

Figure 4:
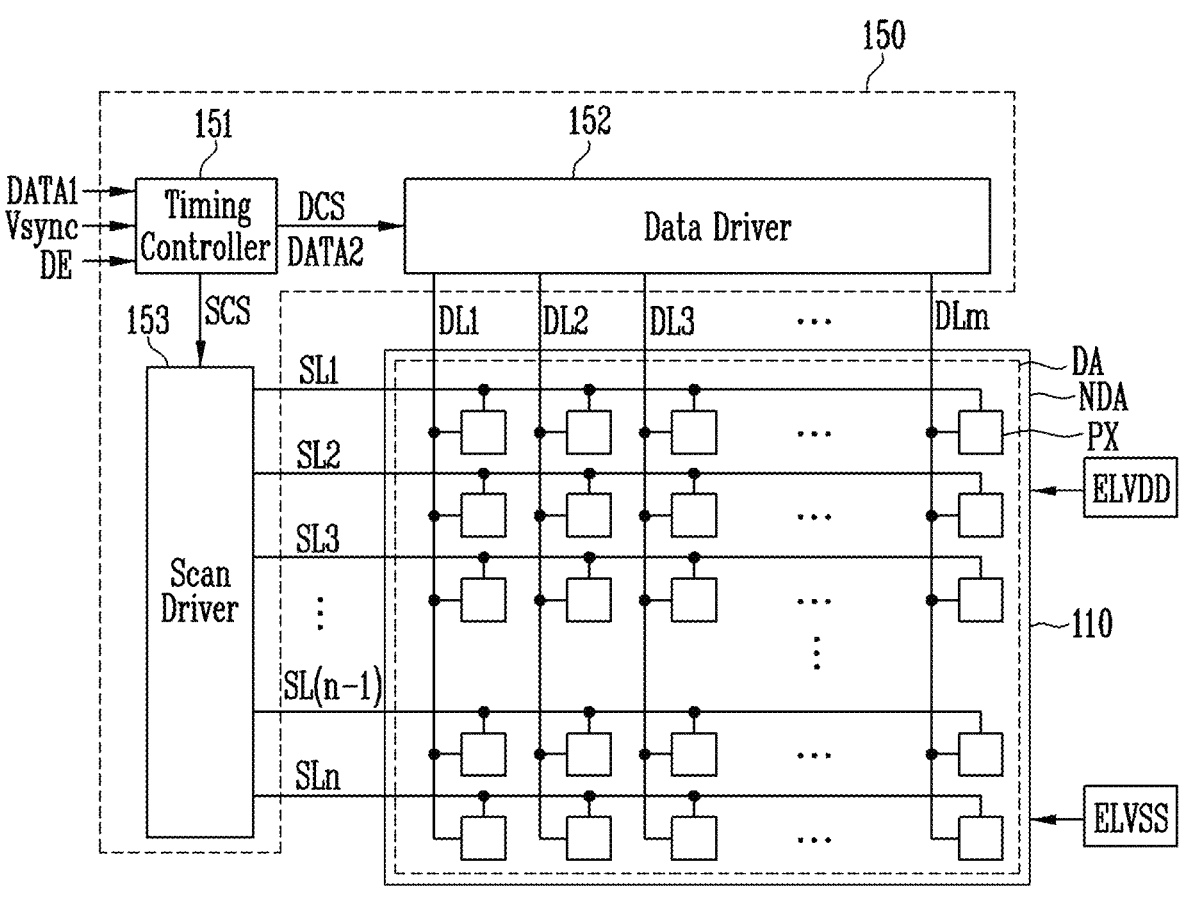
FIG. 4 is a block diagram illustrating aspects of a display panel and a display driver of FIG. 1 according to some embodiments.

FIG. 4 is a block diagram illustrating aspects of a display panel and a display driver of FIG. 1 according to some embodiments.

Referring to FIG. 4, the display device 1 may include the display panel 110 and the display driver 150.

The display panel 110 may include the pixels PX, and the data lines DL and the driving lines SL connected to the pixels PX. The data lines DL may include first to m-th data lines DL1 to DLm. The driving lines SL may include first to n-th driving lines SL1 to SLn, where n and m may be integers greater than or equal to 1.

The display panel 110 may include the display area DA for images, and the non-display area NDA around the display area DA. The non-display area NDA may at least partially surround (e.g., in a periphery or outside a footprint of) the display area DA.

Each of the pixels PX may be connected to a first power source ELVDD and a second power source ELVSS.

The pixels PX may include light emitting elements LD (see FIG. 2). Each pixel may control current flowing from the first power source ELVDD to the second power source ELVSS via a light emitting element according to a data signal supplied through a corresponding data line. In addition, the light emitting element may generate light according to the controlled current. The first power source ELVDD may be a high-potential voltage, and the second power source ELVSS may be a low-potential voltage.

The display driver 150 may include the timing controller 151, the data driver 152, and the scan driver 153.

The timing controller 151 may generate control signals for controlling the scan driver 153 and the data driver 152 in response to control signals from outside. For example, the control signals from the outside may include a data enable signal DE and a vertical synchronization signal Vsync. For example, the timing controller 151 may control the scan driver 153 by outputting a scan driver control signal SCS to the scan driver 153 in response to the control signals from the outside. The timing controller 151 may control the data driver 152 by outputting a data driver control signal DCS to the data driver 152 in response to the control signals from the outside.

The timing controller 151 may convert first image data DATA1 input from the outside into second image data DATA2 suitable for the specifications of the data driver 152 and supply the second image data DATA2 to the data driver 152.

The first image data DATA1 may include luminance information of each of the pixels PX of the display panel 110, and the first image data DATA1 may be divided into frame units.

The data enable signal DE may be a signal that defines a period during which valid data is input.

The data driver 152 may generate data signals according to the data driver control signal DCS and the second image data DATA2 input from the timing controller 151. The data driver 152 may supply the generated data signals to the first to m-th data lines DL1 to DLm.

In order to be connected to the first to m-th data lines DL1 to DLm, the data driver 152 may be directly mounted on the substrate on which the pixels PX are formed, or may be connected to the substrate on which the pixels PX are formed through a separate component, such as a flexible circuit board.

When a driving signal is supplied to each driving line, pixels PX connected to the corresponding driving line may receive the data signals transmitted from the first to m-th data lines DL1 to DLm, and the corresponding pixels PX may emit light with a luminance corresponding to the supplied data signals.

The scan driver 153 may supply driving signals to the first to n-th driving lines SL1 to SLn in response to the scan driver control signal SCS. For example, the scan driver 153 may sequentially supply the driving signals to the first to n-th driving lines SL1 to SLn.

In order to be connected to the first to n-th driving lines SL1 to SLn, the scan driver 153 may be directly mounted on the substrate on which the pixels PX are formed, or may be connected to the substrate on which the pixels PX are formed through a separate component, such as a flexible circuit board.

In FIG. 4, the timing controller 151, the data driver 152, and the scan driver 153 are shown as separate components, but at least some of the components may be integrated according to some embodiments.

Figure 5:
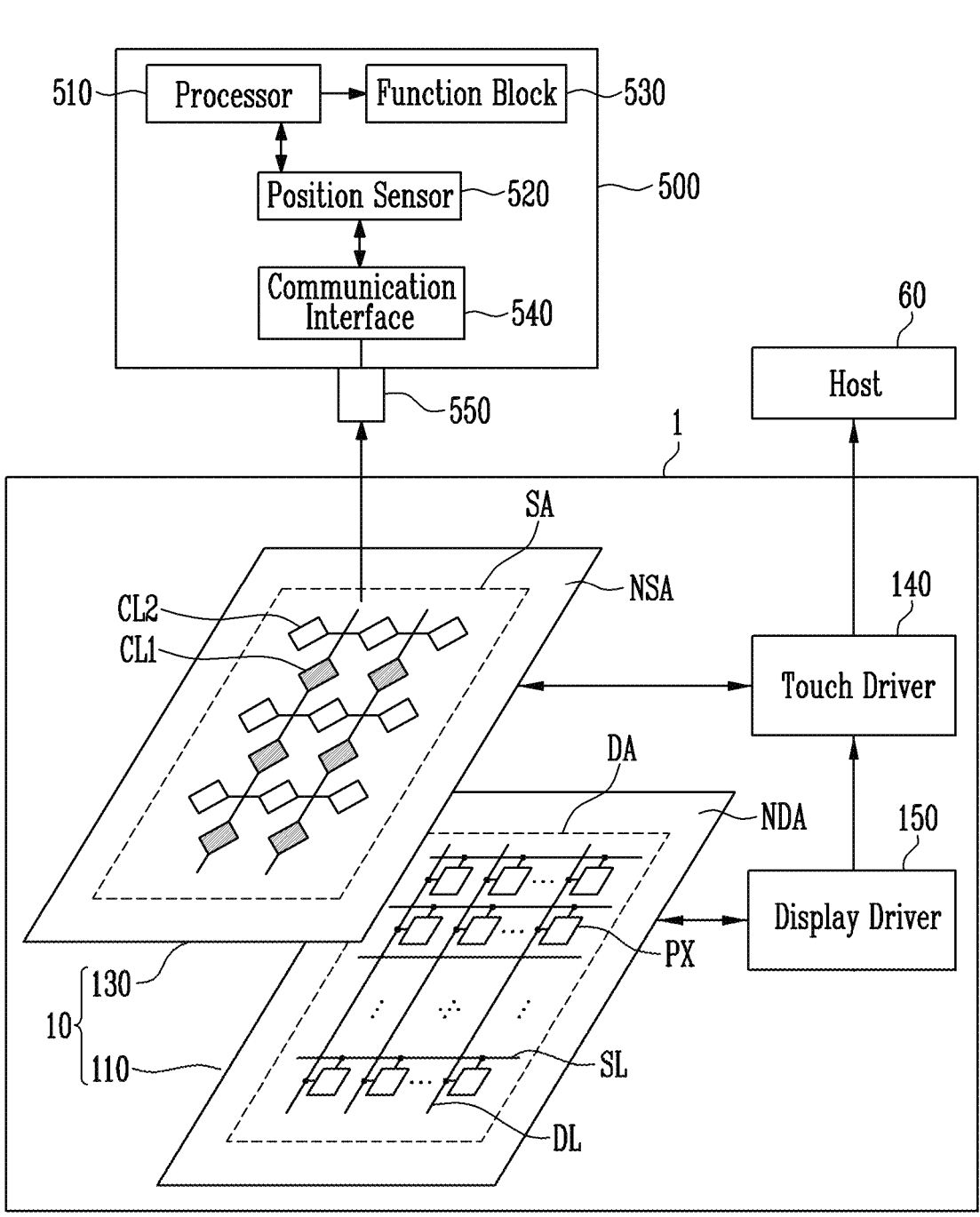
FIG. 5 is a block diagram illustrating aspects of a display system including the display device according to some embodiments.

FIG. 5 is a block diagram illustrating aspects of a display system including the display device according to some embodiments.

Referring to FIG. 5, a display system may include a display device 1, a host 60, and an external device 500.

The display device 1 may include a panel 10, a touch driver 140, and a display driver 150. The panel 10 may include a display panel 110 and a touch array 130. The touch array 130 may include sensing electrodes RX and driving electrodes TX.

The external device 500 may include a processor 510, a position sensor 520, a function block 530, a communication interface 540, and a receiving electrode 550. According to some embodiments, the external device 500 may include an active pen.

The function block 530 may include a display module configured to display an image, a motor or propeller for physically moving the external device 500, and the like.

According to some embodiments, the display driver 150 may periodically transmit a vertical synchronization signal Vsync and/or information on the vertical synchronization signal Vsync to the touch driver 140.

Referring to FIGS. 3 and 5, first to p-th sensing electrodes RX1 to RXp and first to q-th driving electrodes TX1 to TXq may intersect with each other. Each sensing electrode and each driving electrode may be electrically isolated from each other, and accordingly, a mutual capacitance may be defined or formed between each sensing electrode and each driving electrode. As such, mutual capacitances may be formed at portions where the first to p-th sensing electrodes RX1 to RXp and the first to q-th driving electrodes TX1 to TXq intersect each other.

When a touch is applied to the touch array 130, one or more of the mutual capacitances may change.

The touch may include at least one of various types of inputs that cause a change in mutual capacitance, such as physical contact or hovering. The touch driver 140 may sense such a change in mutual capacitance to recognize the touch.

The touch driver 140 may encode data representing each touch electrode (or the position of each touch electrode) and output an encoded data signal as uplink signals US1 (see FIG. 6) to the external device 500 through a corresponding touch electrode. For example, the touch driver 140 may encode data corresponding to each of the first to q-th driving electrodes TX1 to TXq and output an encoded data signal as uplink signals US1 through a corresponding driving electrode. In addition, the touch driver 140 may encode data corresponding to each of the first to p-th sensing electrodes RX1 to RXp and output an encoded data signal as uplink signals US1 through a corresponding sensing electrode. Accordingly, the uplink signals US1 indicating different positions may be output through each touch electrode.

The uplink signals US1 may have an electrical pulse form including a digital component representing positional information of the touch electrodes.

According to some embodiments, the uplink signals US1 may further include information on the vertical synchronization signal Vsync, information on the panel 10, protocol version information, and the like. In this case, the external device 500 may obtain the information on the vertical synchronization signal Vsync from an uplink signal and determine a transmission time point of a downlink signal accordingly. In addition, the external device 500 may check the information on the panel 10 or a protocol version from the uplink signals US1.

In addition, the touch driver 140 may generate beacon signals Beacon (see FIG. 6) and transmit the beacon signals Beacon to the external device 500 through a touch electrode. In addition, the touch driver 140 may select a protocol and control timing according to the beacon signals Beacon. In addition, after the external device 500 normally receives the beacon signals Beacon, the external device 500 may derive information from the beacon signals Beacon. For example, the beacon signals Beacon may be signals periodically transmitted from the touch array 130 and may include one or more of panel information (for example, panel status information, panel identification information, and the like) and characteristic information of the downlink signal (for example, frequency and voltage level). In addition, the beacon signals Beacon may further include information for drive synchronization between the touch array 130 and the external device 500.

The beacon signals Beacon may have an electrical pulse form including the panel information, the information for drive synchronizing between the touch array 130 and the external device 500, and the like.

The touch driver 140 may transmit the uplink signals US1 to the external device 500 after transmitting the beacon signals Beacon to the external device 500.

According to some embodiments, the beacon signals Beacon may be transmitted at a different frequency from the uplink signals US1. Alternatively, the beacon signals Beacon may be transmitted at a different transmission voltage from the uplink signals US1. This is to allow the external device 500 to quickly determine a time point at which the uplink signals US1 start being transmitted (or a time point at which the beacon signals Beacon end being transmitted).

The receiving electrode 550 of the external device 500 may be connected to the communication interface 540. When the receiving electrode 550 approaches the touch array 130, a capacitance or capacitor (e.g., a relatively small capacitor) may be formed between at least some of the sensing electrodes RX and the driving electrodes TX, and the receiving electrode 550. In this case, the external device 500 may communicate the beacon signal, the uplink signal, and the downlink signal with corresponding sensing electrodes and/or driving electrodes through the relatively small capacitor. The receiving electrode 550 may receive the uplink signals US1 after receiving the beacon signals Beacon from the sensing electrodes RX and the driving electrodes TX.

The communication interface 540 may perform drive synchronization between the external device 500 and the touch array 130 based on a time point at which the beacon signals Beacon are received from the receiving electrode 550.

The communication interface 540 may amplify the received signal. For example, the communication interface 540 may amplify the uplink signals US1 received through the receiving electrode 550 during an uplink process, and transmit the amplified uplink signals US1 to the position sensor 520.

The processor 510 may be configured to control all operations of the external device 500. For example, the processor 510 may control the position sensor 520. For example, the processor 510 may transmit a position sensor control signal to the position sensor 520 to control the operation of the position sensor 520.

The position sensor 520 may decode the uplink signals US1 received from the communication interface 540 to derive position information.

The processor 510 may receive the position information from the position sensor 520. According to some embodiments, the processor 510 may transmit the received position information to the function block 530. The function block 530 may perform various functions using the received position information. For example, the function block 530 may include a display module. In this case, the function block 530 may visualize the received position information. As another example, the function block 530 may include a motor for moving the external device 500 in a specific direction. In this case, the function block 530 may drive the motor according to the received position information to move the external device 500.

According to some embodiments, the processor 510 may control the position sensor 520 and the communication interface 540 to transmit the position information to the display device 1 in the form of a downlink signal. In this case, the position sensor 520 may encode the position information and provide an encoded data signal to the communication interface 540. The communication interface 540 may amplify the encoded data signal. In addition, the communication interface 540 may transmit the amplified signal as a downlink signal to the touch array 130 through the receiving electrode 550. The display device 1 may receive the downlink signal through a touch electrode adjacent to the receiving electrode 550 among the sensing electrodes RX and the driving electrodes TX of the touch array 130.

According to some embodiments, the downlink signal may further include status information of the external device 500. For example, when the external device 500 is an active pen, the status information may further include button status information of the active pen, battery status information of the active pen, tilt information of the active pen when the active pen is in contact with the touch array 130, and the like.

The touch driver 140 may receive the downlink signal through the touch array 130. The touch driver 140 may decode the downlink signal to extract the position information of the external device 500. According to some embodiments, the downlink signal may further include status information associated with the external device 500.

In this case, the touch driver 140 may decode the downlink signal to further extract the status information of the external device 500. The touch driver 140 may transmit the extracted position information and status information to the host 60. According to some embodiments, the display device 1 and the host 60 may perform wired communication with each other. According to some embodiments, the display device 1 and the host 60 may perform wireless communication with each other.

Figure 6:
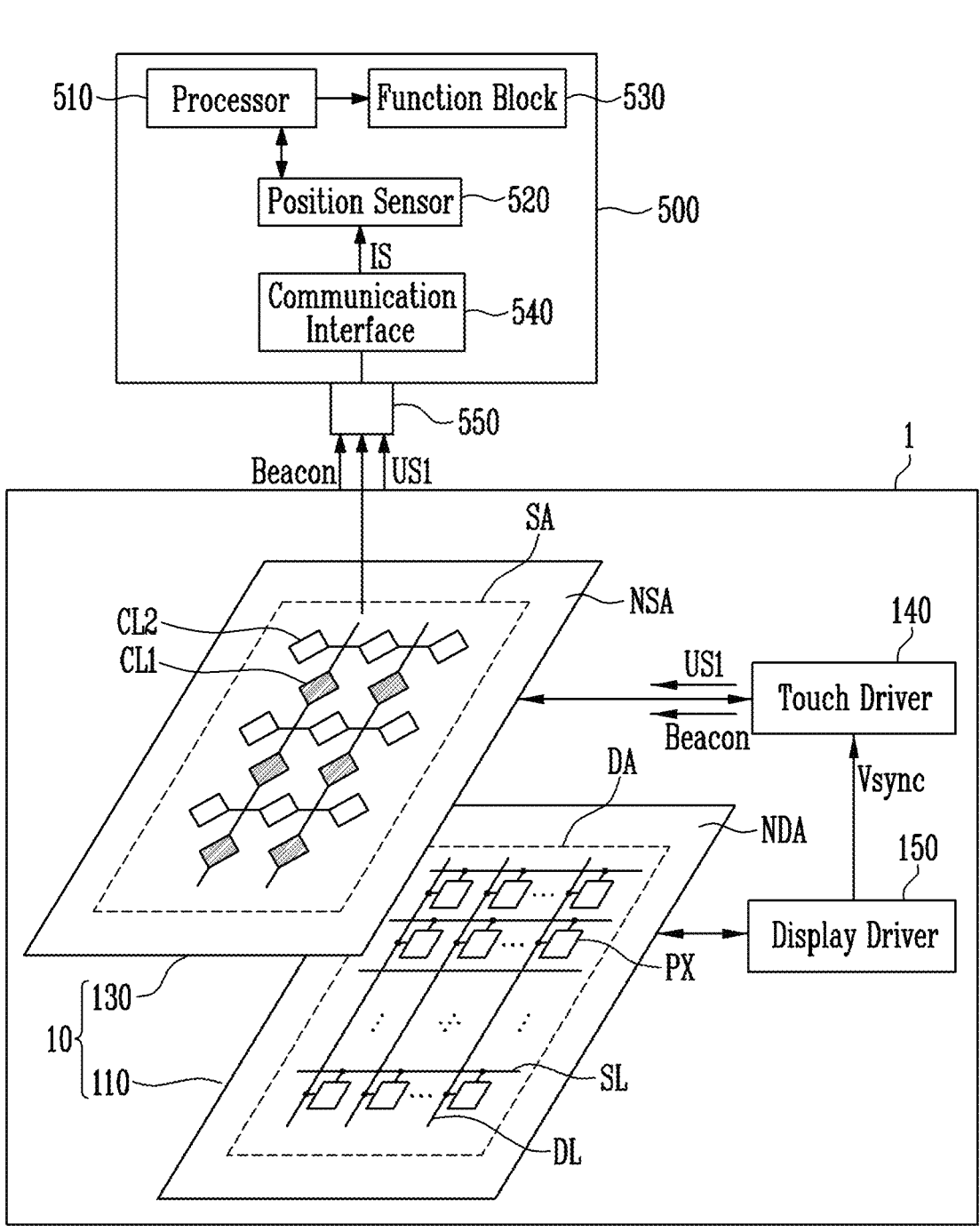
FIG. 6 is a block diagram for explaining the processes through which beacon signals and uplink signals are communicated in the display system of FIG. 5.

FIG. 6 is a block diagram for explaining the processes through which beacon signals and uplink signals are communicated in the display system of FIG. 5.

Referring to FIG. 6, the touch driver 140 may encode data indicating the positions of each of the sensing electrodes RX and the driving electrodes TX, and output an encoded data signal as the uplink signals US1 to the external device 500 through a corresponding touch electrode. For example, the touch driver 140 may encode data corresponding to each of the first to q-th driving electrodes TX1 to TXq of FIG. 3, and output an encoded data signal as the uplink signals US1 through a corresponding driving electrode. In addition, the touch driver 140 may encode data corresponding to each of the first to p-th sensing electrodes RX1 to RXp of FIG. 3, and output an encoded data signal as the uplink signals US1 through a corresponding sensing electrode. Accordingly, the uplink signals US1 indicating different positions may be output through each touch electrode.

In addition, the touch driver 140 may generate the beacon signals Beacon and transmit the beacon signals Beacon to the external device 500 through the touch electrode. In addition, the touch driver 140 may select a protocol and control timing according to the beacon signals Beacon. The beacon signals Beacon may be signals periodically transmitted from the touch array 130 and may include one or more of panel information (for example, panel status information, panel identification information, and the like) and characteristic information of the downlink signal (for example, frequency and voltage level). In addition, the beacon signals Beacon may further include information for drive synchronization between the touch array 130 and the external device 500.

According to some embodiments, the touch driver 140 may output the uplink signals US1 and the beacon signals Beacon in response to the external device 500 approaching the touch array 130. For example, when the external device 500 approaches the touch array 130 and a change in mutual capacitance between the sensing electrodes RX and the driving electrodes TX is sensed by the touch driver 140, the touch driver 140 may output the uplink signals US1 and the beacon signals Beacon.

According to some embodiments, the display driver 150 may periodically transmit the vertical synchronization signal Vsync and/or information on the vertical synchronization signal Vsync to the touch driver 140. The touch driver 100 may output the uplink signals US1 and the beacon signals Beacon through the sensing electrodes RX and the driving electrodes TX with reference to the vertical synchronization signal Vsync.

When the external device 500 approaches the touch array 130, the external device 500 may receive the uplink signals US1 and the beacon signals Beacon from at least some of the sensing electrodes RX and the driving electrodes TX. When the external device 500 approaches the touch array 130, an electric field may be generated between the receiving electrode 550 and the touch array 130. As the electric field is formed, a virtual capacitance may be formed between at least some of the sensing electrodes RX and the driving electrodes TX, and the receiving electrode 550. The impedance of the virtual capacitance may decrease as the external device 500 approaches the corresponding touch electrode. As the impedance of the virtual capacitance decreases, the uplink signals US1 and the beacon signals Beacon may be smoothly transmitted from the corresponding touch electrode to the receiving electrode 550. For example, the external device 500 may receive the uplink signals US1 and the beacon signals Beacon from an adjacent driving electrode among the first to q-th driving electrodes TX1 to TXq, and may receive the uplink signals US1 and the beacon signals Beacon from an adjacent sensing electrode among the first to p-th sensing electrodes RX1 to RXp.

The communication interface 540 may decode the received beacon signals Beacon to obtain the panel information and perform drive synchronization with the touch array 130.

Next, the communication interface 540 may receive the uplink signals US1 through the receiving electrode 550. The communication interface 540 may amplify the received uplink signals US2 and transmit the amplified uplink signals US2 to the position sensor 520 in the form of an input signal IS.

The position sensor 520 may decode the input signal IS to obtain touch position information above the touch array 130 of the external device 500.

According to some embodiments, the external device 500 may include a communication device that supports wireless communication such as Bluetooth communication. The processor 510 may transmit the touch position information to the host 60 through wireless communication using such a communication device.

According to some embodiments, the host 60 may be included in a computing device such as a computer, a laptop, a mobile phone, a smart phone, or a wearable device together with the display device 1. The host 60 may perform various operations using the acquired touch position information.

In addition, the external device 500 may perform various operations using the touch position information. For example, the external device 500 may include the function block 530 for performing various operations, and the function block 530 may receive the touch position information from the processor 510. The function block 530 may perform various operations using the touch position information.

Figure 7:
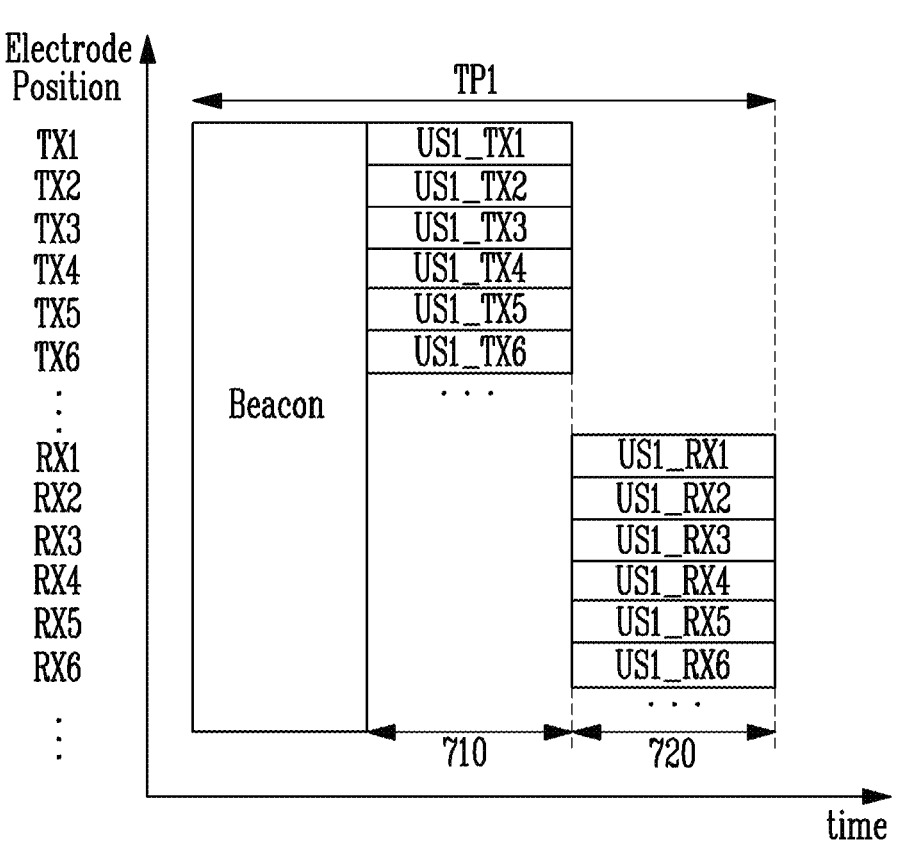
FIGS. 7 to 9 are timing diagrams illustrating embodiments of the beacon signals and the uplink signals in a first time period.
Figure 8:
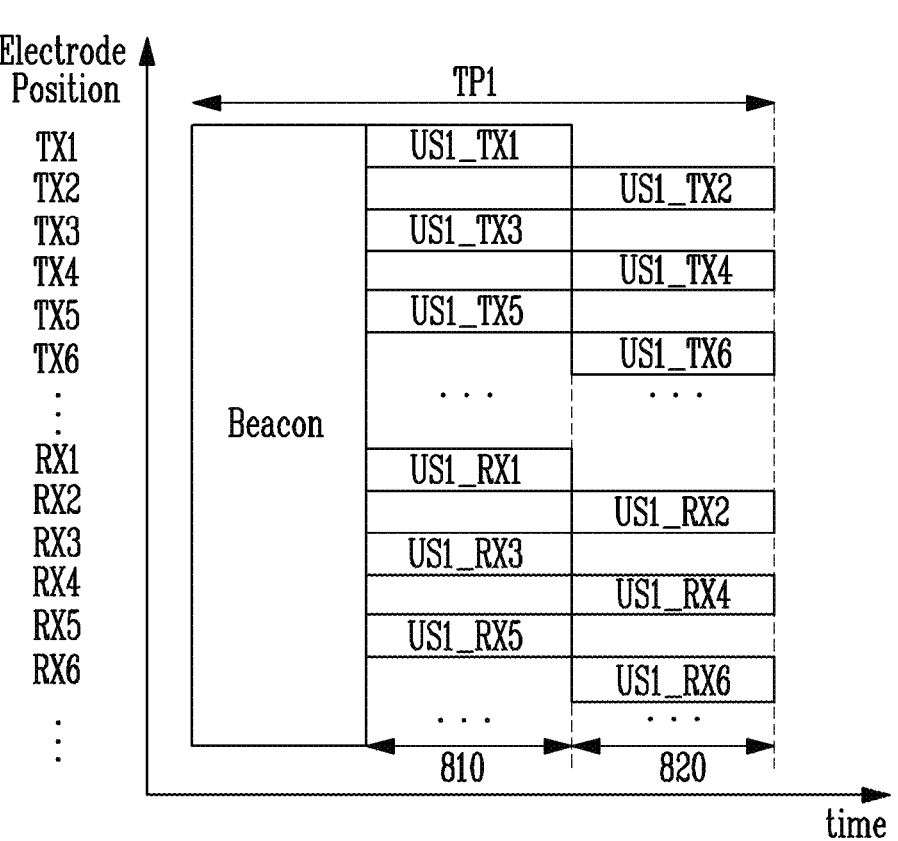
Figure 9:
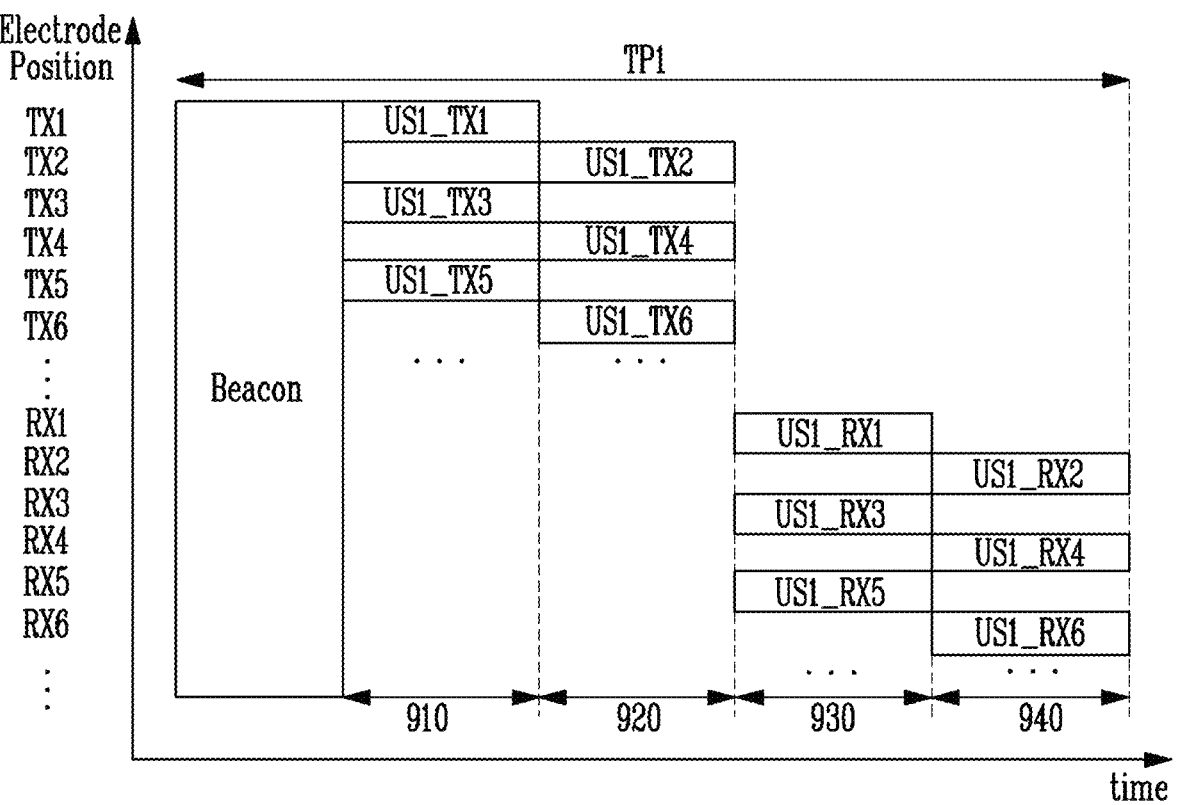

FIGS. 7 to 9 are timing diagrams illustrating embodiments of the beacon signals and the uplink signals in a first time period.

In FIGS. 7 to 9, the display device 1 and the external device 500 may communicate on a frame-by-frame or packet-by-packet basis. A first frame may include a first time period TP1 for transmitting an uplink signal and a second time period TP1 for transmitting a downlink signal. According to some embodiments, a second frame after the first frame may also include the first time period TP1. Further, the second frame may further include the second time period TP2 after the first time period TP1. As described above, communication between the display device 1 and the external device 500 may include a plurality of frames, and each frame may further include the first time period TP1 and the second time period TP2. However, for convenience of description, the first time period TP1 during which the uplink signal is transmitted among a plurality of time periods of the frame is shown as an example. Details regarding the second time period TP2 will be described in more detail below with reference to FIG. 15.

For example, in the first time period TP1, the display device 1 may transmit the beacon signals Beacon to the external device 500, and select a protocol and control timing according to the beacon signal. In addition, the external device 500 may derive information from the beacon signals Beacon after normally receiving the beacon signals Beacon. For example, the beacon signals Beacon may be signals periodically transmitted from the touch array 130 and may include one or more of panel information (for example, panel status information, panel identification information, and the like) and characteristic information of the downlink signal (for example, frequency and voltage level). In addition, the beacon signals Beacon may further include information for drive synchronization between the touch array 130 and the external device 500.

Referring to FIGS. 3 and 7, the first time period TP1 may include a first sub-time period 710 for transmitting the uplink signals US1 including position information of the driving electrodes TX1 to TXq after a period for transmitting the beacon signal, and a second sub-time period 720 for transmitting the uplink signals US1 including position information of the sensing electrodes RX1 to RXq.

For example, in the first sub-time period 710, the display device 1 may transmit uplink signals US1_TX1 to US1_TXq of the driving electrodes TX1 to TXq corresponding to the driving electrodes TX1 to TXq to the external device 500. In addition, in the second sub-time period 720 after the first sub-time period 710, the display device 1 may transmit uplink signals US1_RX1 to US1_RXq of the sensing electrodes RX1 to RXq corresponding to the sensing electrodes RX1 to RXq to the external device 500. Here, each of the uplink signals may have an electrical pulse form including a digital component representing positional information of the touch electrodes. That is, each uplink signal may include multiple pulses of different forms.

Referring to FIGS. 3 and 8, the first time period TP1 may include a first sub-time period 810 for transmitting uplink signals including position information of selected driving electrodes TX1, TX3, TX5, . . . , and TX(2N−1) among the driving electrodes TX1 to TXq and selected sensing electrodes RX1, RX3, RX5, . . . , and RX(2N−1) among the sensing electrodes RX1 to RXq after a period for transmitting the beacon signals Beacon, and a second sub-time period 820 for transmitting uplink signals including position information of selected driving electrodes TX2, TX4, TX6, . . . , and TX(2N) among the driving electrodes TX1 to TXq and selected sensing electrodes RX2, RX4, RX6, . . . , and RX(2N) among the sensing electrodes RX1 to RXq.

For example, in the first sub-time period 810, the display device 1 may transmit uplink signals US1_TX1, US1_TX3, US1_TX5, . . . . US1_TX(2N−1), US1_RX1, US1_RX3, US1_RX5, . . . , and US1_RX(2N−1) corresponding to the selected driving electrodes TX1, TX3, TX5, . . . , and TX(2N−1) among the driving electrodes TX1 to TXq and the selected sensing electrodes RX1, RX3, RX, . . . , and RX(2N−1) among the sensing electrodes RX1 to RXq to the external device 500. In addition, in the second sub-time period 820 after the first sub-time period 810, the display device 1 may transmit uplink signals US1_TX2, US1_TX4, US1_TX6, . . . . US1_TX(2N), US1_RX2, US1_RX4, US1_RX6, . . . , and US1_RX(2N) corresponding to the selected driving electrodes TX2, TX4, TX6, . . . , and TX(2N) among the driving electrodes TX1 to TXq and the selected sensing electrodes RX2, RX4, RX6, . . . , and RX(2N) among the sensing electrodes RX1 to RXq to the external device 500.

Referring to FIGS. 3 and 9, the first time period TP1 may include a first sub-time period 910 for transmitting an uplink signal including position information of the selected driving electrodes TX1, TX3, TX5, . . . , and TX(2N−1) among the driving electrodes TX1 to TXq after a period for transmitting the beacon signals Beacon, a second sub-time period 920 for transmitting an uplink signal including position information of the remaining driving electrodes TX2, TX4, TX6, . . . , and TX(2N) among the driving electrodes TX1 to TXq, a third sub-time period 930 for transmitting an uplink signal including position information of the selected sensing electrodes RX1, RX3, RX5, . . . , and RX(2N−1) among the sensing electrodes RX1 to RXq, and a fourth sub-time period 940 for transmitting an uplink signal including position information of the remaining sensing electrodes RX2, RX4, RX6, . . . , and RX(2N) among the sensing electrodes RX1 to RXq.

For example, in the first sub-time period 910, the display device 1 may transmit uplink signals US1_TX1, US1_TX3, US1_TX5, . . . , and US1_TX(2N−1) of the selected driving electrodes corresponding to the selected driving electrodes TX1, TX3, TX5, . . . , and TX(2N−1) among the driving electrodes TX1 to TXq to the external device 500. In addition, in the second sub-time period 920 after the first sub-time period 910, the display device 1 may transmit uplink signals US1_TX2, US1_TX4, US1_TX6, . . . , and US1_TX(2N) of the remaining driving electrodes corresponding to the remaining driving electrodes TX2, TX4, TX6, . . . , and TX(2N) among the driving electrodes TX1 to TXq to the external device 500. In addition, in the third sub-time period 930 after the second sub-time period 920, the display device 1 may transmit uplink signals US1_RX1, US1_RX3, US1_RX5, . . . , and US1_RX(2N−1) of sensing electrodes corresponding to the selected sensing electrodes RX1, RX3, RX5, . . . , and RX(2N−1) among the sensing electrodes RX1 to RXq to the external device 500. In addition, in the fourth sub-time period 940 after the third sub-time period 930, the display device 1 may transmit uplink signals US1_RX2, US1_RX4, US1_RX6, . . . , and US1_RX(2N) of sensing electrodes corresponding to the remaining sensing electrodes RX2, RX4, RX6, . . . , and RX(2N) among the sensing electrodes RX1 to RXq to the external device 500.

As described above, the first time period TP1 may be divided into N sub-time periods after the period of transmitting the beacon signals Beacon. In addition, the driving electrodes and the sensing electrodes may be grouped in various ways, and the uplink signals US1 may be transmitted through one group of touch electrodes in each sub-time period.

Figure 10:
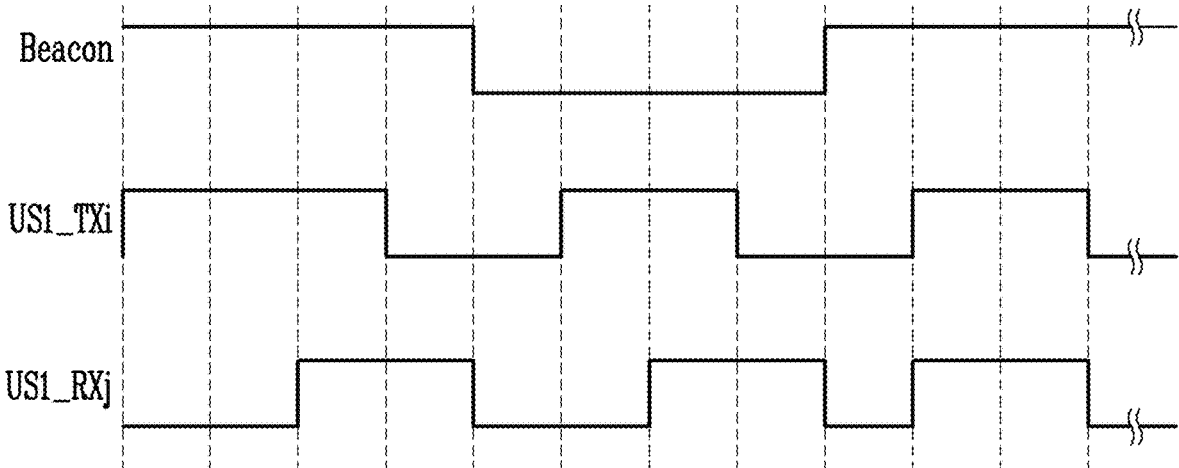
FIG. 10 is a diagram for explaining waveforms of the beacon signals and the uplink signals.

FIG. 10 is a diagram for explaining waveforms of the beacon signals and the uplink signals.

Referring to FIG. 10, the uplink signals US1 may be pulse signals of different forms including 1 or 0 in a plurality of bit strings. The beacon signals Beacon may be pulse signals including 1 or 0 in a plurality of bit strings.

Hereinafter, an uplink signal US1_TXi corresponding to an i-th driving electrode TXi and an uplink signal US1_RXj corresponding to a j-th sensing electrode RXj are described as examples, where i may be an integer greater than or equal to 1 and less than or equal to q, and j may be an integer greater than or equal to 1 and less than or equal to p.

A range of the run length of the beacon signals Beacon may be distinguished from a range of the run length of the uplink signals US1. Here, the run length may be defined as the number of identical data repeated when the same data is repeated in pulse signals. For example, according to some embodiments, the touch driver 140 may generate the uplink signals US1 so that a maximum run length is K, and may generate the beacon signals so that the run length is greater than or equal to K+1, where K may be an integer greater than or equal to 1.

Referring to FIG. 10, the beacon signals Beacon may be pulse signals including 111100001111. The beacon signals Beacon may be pulse signals in the form of four consecutive repetitions of 1, four consecutive repetitions of 0, and four consecutive repetitions of 1. The run length of the beacon signals Beacon may be 4.

On the other hand, referring to FIG. 10, the uplink signal US1_TXi corresponding to the i-th driving electrode TXi may be a pulse signal including 111001100110. The uplink signal US1_TXi corresponding to the i-th driving electrode TXi may be a pulse signal in the form of two 0s and two 1s alternately arranged after three consecutive repetitions of 1. A maximum run length of the uplink signal US1_TXi corresponding to the i-th driving electrode TXi may be 3.

Referring to FIG. 10, the uplink signal US1_RXj corresponding to the j-th sensing electrode RXj may be a pulse signal including 001100110110, where j may be an integer greater than or equal to 1 and less than or equal to p. The uplink signal US1_RXj corresponding to the j-th sensing electrode RXj may have a maximum run length of 2, where j may be an integer greater than or equal to 1 and less than or equal to p.

In the example, the run length of the beacon signals Beacon may be 4, and a maximum run length of the uplink signals US1 may be 3.

According to some embodiments of the present invention, the display device 1 may transmit the uplink signals US1 after transmitting the beacon signals Beacon to the external device 500. The range of the run length of the beacon signals Beacon and the range of the run length of the uplink signals US1 may be different from each other. Through this, the external device 500 may quickly determine the point at which the transmission of the beacon signals Beacon ends (or the point at which the transmission of the uplink signals US1 begins). In addition, the external device 500 may quickly calculate the position information by decoding the uplink signals US1.

Figure 11:
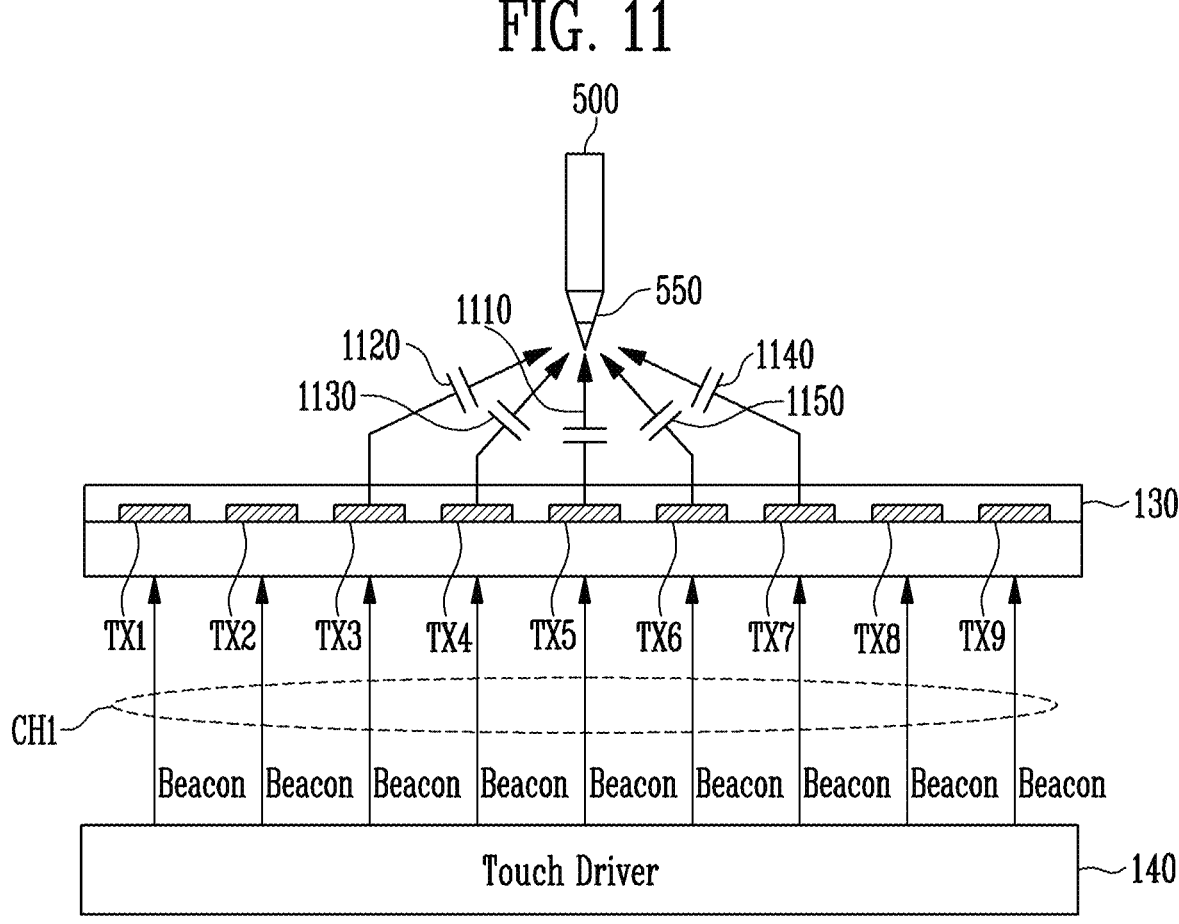
FIGS. 11 and 12 are diagrams illustrating an external device, a touch array, and capacitors formed between the external device and the touch array.
Figure 12:
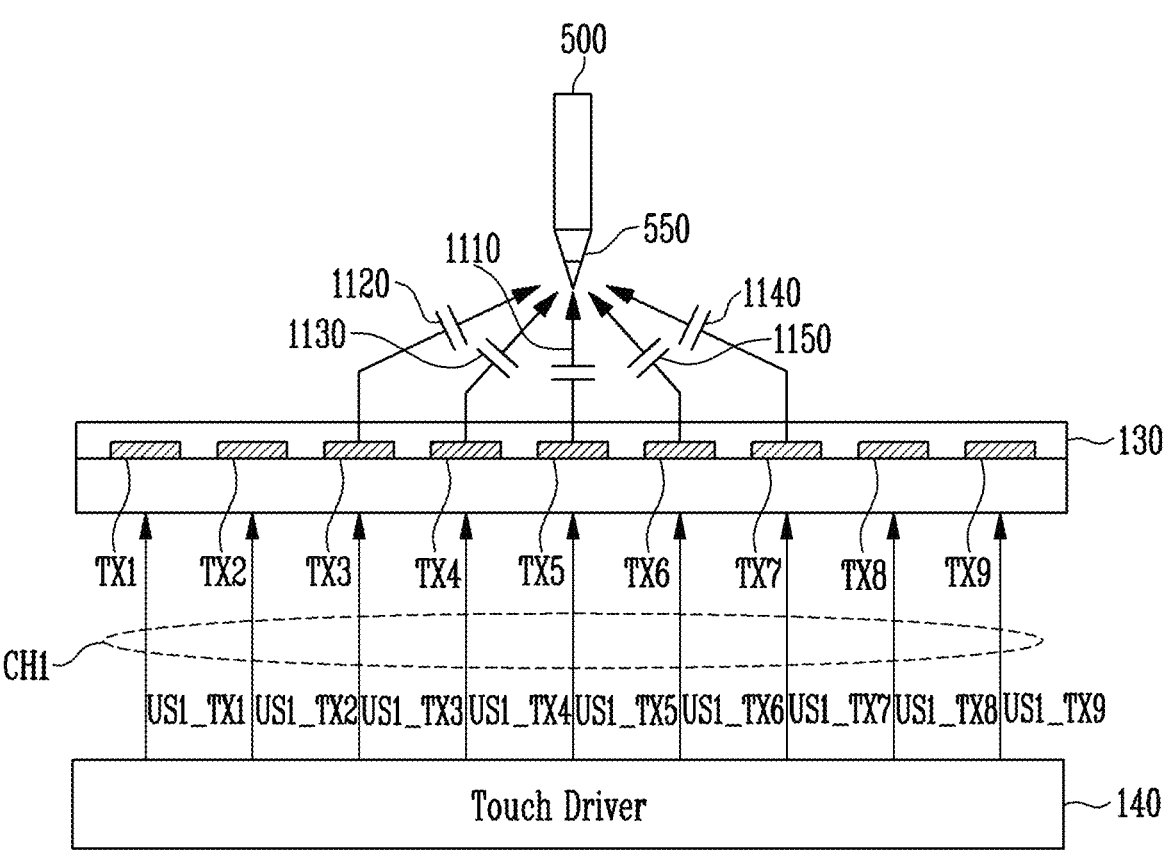

FIGS. 11 and 12 are diagrams illustrating an external device, a touch array, and capacitors formed between the external device and the touch array. Here, the external device 500 may include an active pen.

Referring to FIGS. 11 and 12, an example of an operation in which the active pen receives the beacon signals Beacon and the uplink signals US1 through capacitors generated between adjacent touch electrodes is described.

First, as shown in FIG. 11, the touch driver 140 may apply the beacon signals Beacon to driving electrodes TX1 to TX9 of the touch array 130 through a first channel CH1. In this case, the beacon signals Beacon applied to the driving electrodes TX1 to TX9 of the touch array 130 may have the same waveform. In addition, the active pen may transmit the beacon signals Beacon through capacitors generated between adjacent touch electrodes TX3 to TX7.

Next, as shown in FIG. 10, the touch driver 140 may apply uplink signals US1_TX1 to US1_TX9 including different position information to the driving electrodes TX1 to TX9 of the touch array 130 through the first channel CH1. The uplink signals US1 applied to the driving electrodes TX1 to TX9 may have different waveforms. In addition, the active pen may transmit uplink signals through capacitors generated between adjacent touch electrodes TX3 to TX7. In addition, the active pen may obtain information on the capacitance of capacitors 1110 to 1150 generated at corresponding touch electrodes from the transmitted uplink signals. For example, the uplink signal transmitted from a driving electrode TX5 of a fifth row, which is closest to the active pen, may include information on the capacitance of the capacitor 1110 generated between the driving electrode TX5 of the fifth row and the external device 500. The uplink signals transmitted from adjacent driving electrodes TX3 to TX7 may include a digital component for the uplink signals US1_TX1 to US1_TX9 including different position information and an analog component for information on the capacitance of the capacitors 1110 to 1150.

According to some embodiments, the position sensor 520 of the active pen may decode the uplink signals received from adjacent driving electrodes TX3 to TX7 and apply them to a preset algorithm to calculate position information of the active pen. The position information of the active pen may be calculated from the digital component included in the uplink signals US1_TX1 to US1_TX9 including different position information. For example, the position sensor 520 may estimate each eigenvector from the decoded uplink signals and assign a relative weight to them to calculate the position information of the active pen.

However, in FIGS. 11 and 12, a case where the driving electrodes consist of nine driving electrodes TX1 to TX9 is described as an example, but the number of driving electrodes is not particularly limited. Also, the sensing electrodes RX1 to RXp may also be the same.

Figure 13:
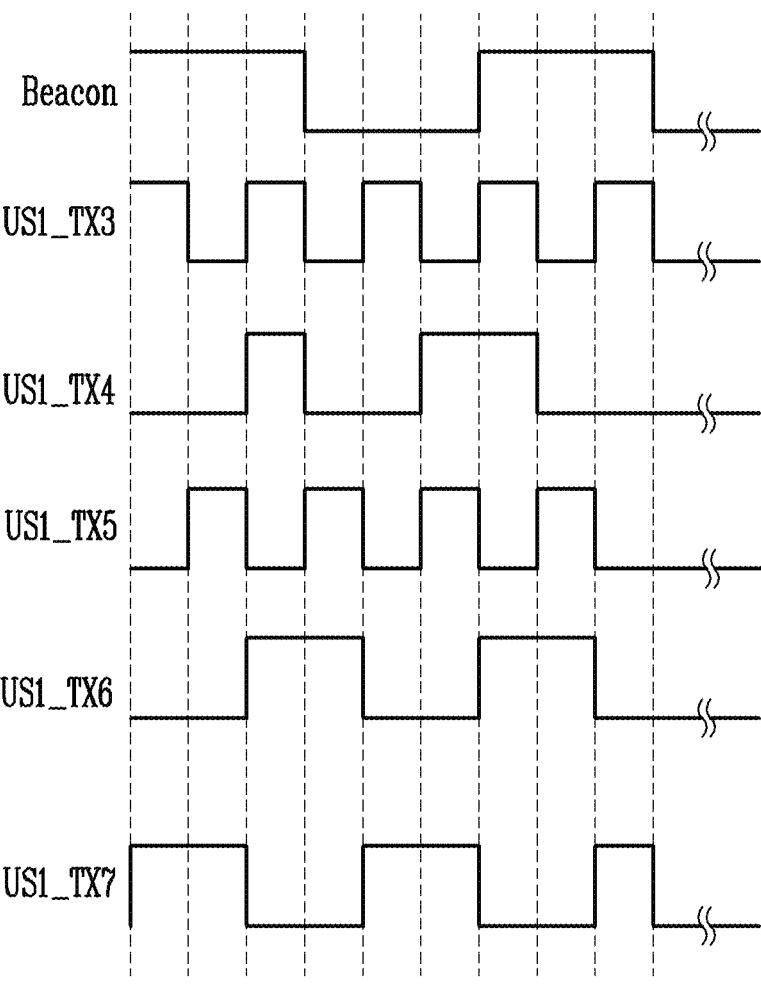
FIG. 13 is a timing diagram illustrating examples of signals applied to some of touch electrodes of FIGS. 11 and 12.

FIG. 13 is a timing diagram illustrating examples of signals applied to some of touch electrodes of FIGS. 11 and 12.

Referring to FIG. 13, uplink signals US1_TX3 to US1_TX7 and beacon signals Beacon applied to driving electrodes TX3 to TX7 adjacent to the external device 500 of FIG. 10 are described. The uplink signals may be signals of digital components generated by encoding based on different position information and modulating based on the encoded signals. The uplink signals may be pulse signals of different forms including 1 or 0 in a plurality of bit strings. The beacon signals Beacon may be pulse signals including 1 or 0 in a plurality of bit strings. For example, the beacon signals Beacon may be signals of digital components including 111000111. For example, the uplink signal US1_TX3 applied to the driving electrode TX3 positioned in a third column may be a signal of a digital component including 101010101. The uplink signal US1_TX4 applied to the driving electrode TX4 positioned in a fourth column may be a signal of a digital component including 001001100. The uplink signal US1_TX5 applied to the driving electrode TX5 positioned in a fifth column may be a signal of a digital component including 010101010. The uplink signal US1_TX7 applied to the driving electrode TX7 positioned in a seventh column may be a signal of a digital component including 110011001. However, examples in which the uplink signals include different position information are described, but the present invention is not limited thereto.

In the example, the run length of the beacon signals Beacon may be 3, and the maximum run length of the uplink signals US1 may be 2.

In the embodiments of the present invention, the display device 1 may transmit the uplink signals US1 after transmitting the beacon signals Beacon to the external device 500. The range of the run length of the beacon signals Beacon and the range of the run length of the uplink signals US1 may be different from each other. Through this, the external device 500 may quickly determine the point at which the transmission of the beacon signals Beacon ends (or the point at which the transmission of the uplink signals US1 begins). In addition, the external device 500 may quickly calculate position information by decoding the uplink signals US1.

Figure 14:
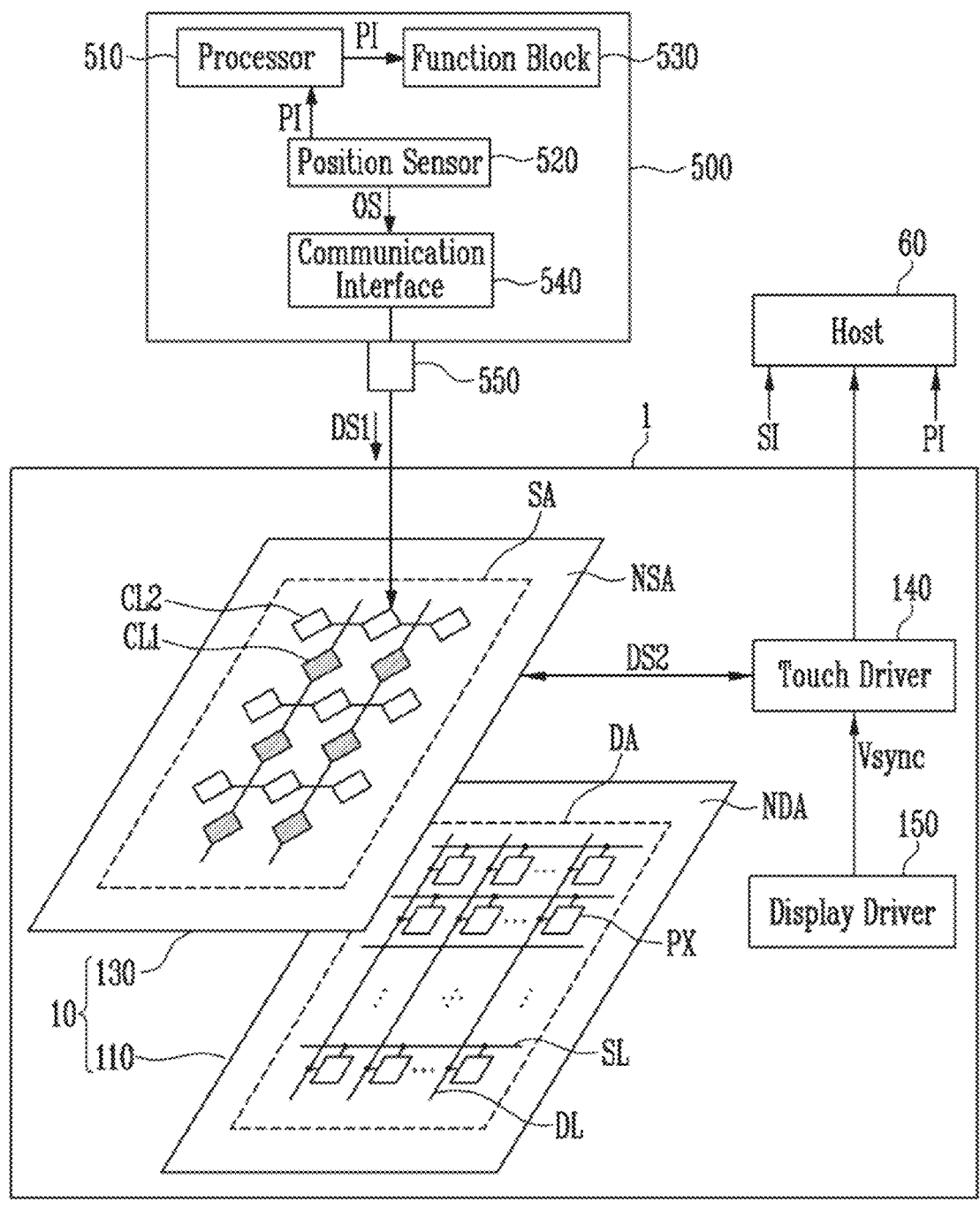
FIG. 14 is a block diagram for explaining the processes through which a downlink signal is communicated in the display system of FIG. 5.

FIG. 14 is a block diagram for explaining the processes through which a downlink signal is communicated in the display system of FIG. 5.

Referring to FIG. 14, the display device 1 may include the touch driver 140, the display driver 150, and the panel 10. The panel 10 may include the touch array 130 and the display panel 110. The touch array 130 may include the sensing electrodes RX and the driving electrodes TX. Hereinafter, descriptions of contents overlapping with those of FIGS. 5 and 6 will be omitted.

The position sensor 520 may decode a signal received from the communication interface 540 to calculate touch position information.

The processor 510 may receive position information PI from the position sensor 520. According to some embodiments, the processor 510 may transmit the received position information PI to the function block 530.

The function block 530 may perform various functions using the received position information PI. For example, the function block 530 may include a display module. In this case, the function block 530 may visualize the received position information PI. As another example, the function block 530 may include a motor for moving the external device 500 in a specific direction. In this case, the function block 530 may drive the motor according to the received position information PI to move the external device 500.

According to some embodiments, the processor 510 may control the position sensor 520 and the communication interface 540 to transmit the position information PI to the display device 1 in the form of a downlink signal DS1. In this case, the position sensor 520 may provide the position information PI to the communication interface 540 in the form of an output signal OS.

The communication interface 540 may amplify the output signal OS and convert the output signal OS into the downlink signal DS1. In addition, the communication interface 540 may output the downlink signal DS1 to the touch array 130 through the receiving electrode 550. The display device 1 may receive the downlink signal DS1 through a touch electrode adjacent to the receiving electrode 550 among the sensing electrodes RX and the driving electrodes TX of the touch array 130.

The touch driver 140 may receive a downlink signal DS2 through the touch array 130. The touch driver 140 may decode the downlink signal DS2 to extract the position information PI of the external device 500.

According to some embodiments, the downlink signal DS2 may further include status information SI associated with the external device 500. In this case, the touch driver 140 may decode the downlink signal DS2 to further extract the status information SI of the external device 500. According to some embodiments, when the external device 500 is an active pen, the status information may further include button status information of the active pen, battery status information of the active pen, tilt information of the active pen when the active pen is in contact with the touch array 130, and the like.

The touch driver 140 may transmit the extracted position information PI and status information SI to the host 60. According to some embodiments, the display device 1 and the host 60 may perform wired communication with each other. According to some embodiments, the display device 1 and the host 60 may perform wireless communication with each other.

Figure 15:
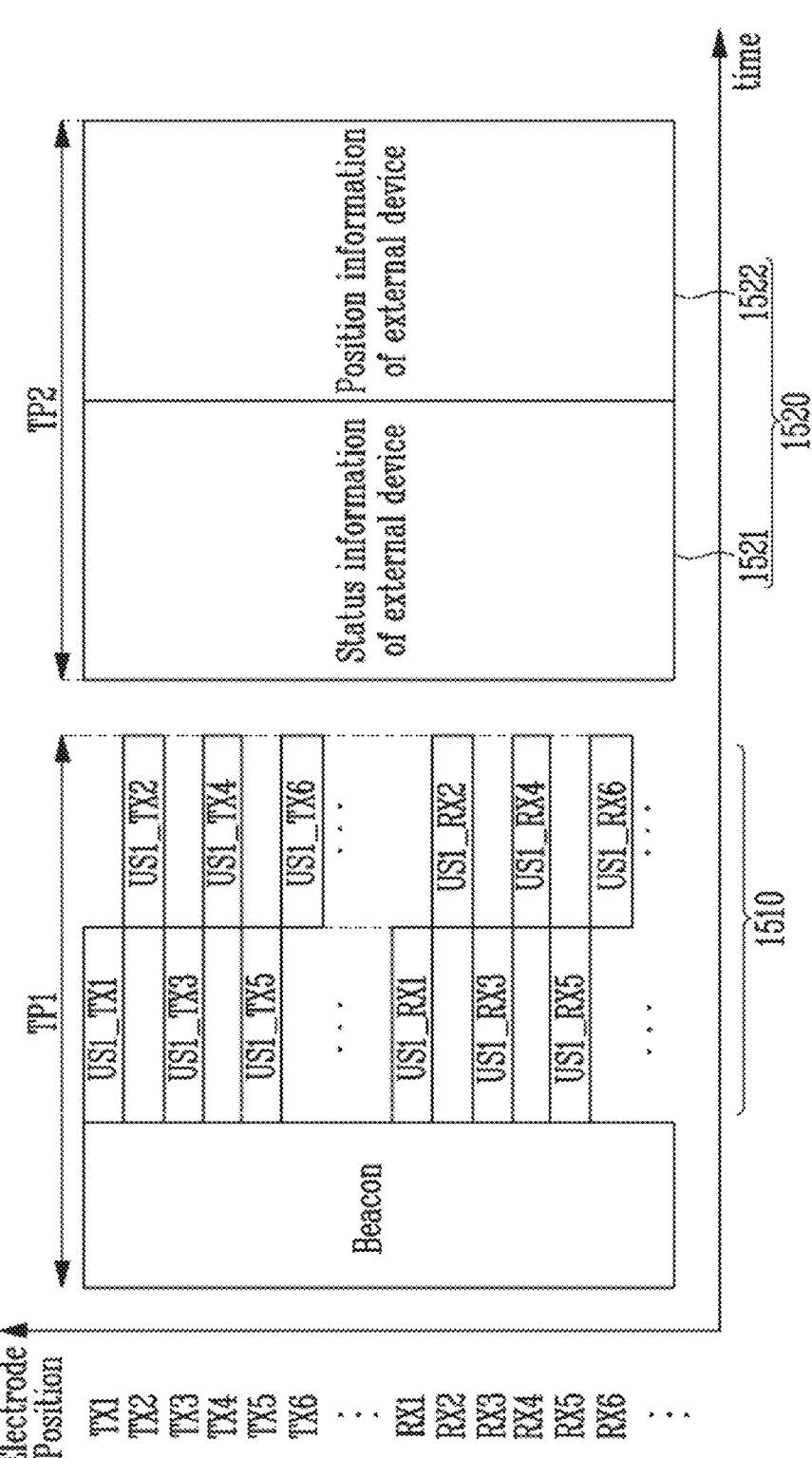
FIG. 15 is a timing diagram illustrating aspects of an uplink signal in a first time period and a downlink signal in a second time period according to some embodiments.

FIG. 15 is a timing diagram illustrating aspects of an uplink signal in a first time period and a downlink signal in a second time period according to some embodiments.

Referring to FIG. 15, communication between the display device 1 and the external device 500 may include a plurality of frames, and each frame may include a first time period TP1 for transmitting uplink signals and a second time period TP2 for transmitting a downlink signal.

As shown in FIG. 15, in the first time period TP1, uplink signals 1510 may be transmitted to the external device 500 through the touch array 130. In the second time period TP2 after the first time period TP1, downlink signal 1520 may be transmitted from the external device 500 through the touch array 130. For example, the position sensor 520 of the external device 500 may calculate position information 1522 of the external device using the received uplink signals. In addition, in the second time period TP2, the position sensor 520 of the external device 500 may transmit the downlink signal including the position information of the external device 500 to the display device 1. The downlink signal 1520 may be transmitted through capacitors generated between touch electrodes adjacent to the external device 500.

The downlink signal 1520 may include status information 1521 of the external device and position information 1522 of the external device. For example, when the external device 500 is an active pen, the status information 1521 of the external device may include one or more of button information, battery information, information for error checking and correction, and the like.

Figure 16:
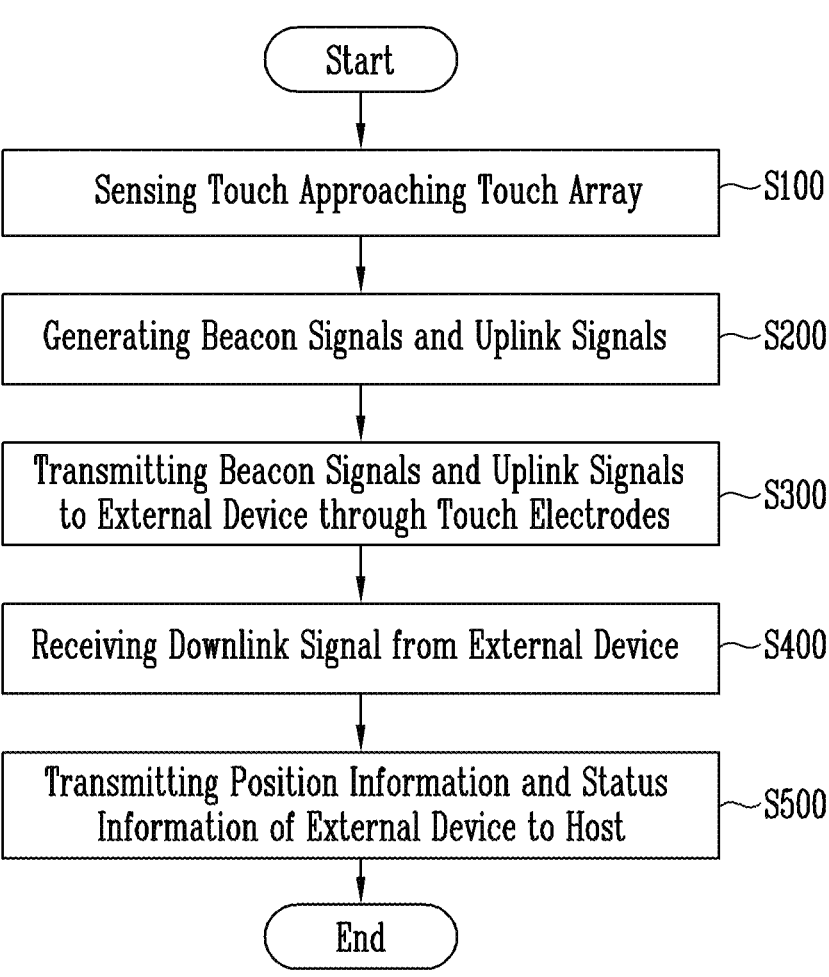
FIG. 16 is a flowchart illustrating a method of driving a display device according to some embodiments of the present invention.

FIG. 16 is a flowchart illustrating a method of driving a display device according to some embodiments of the present invention. Although FIG. 16 illustrates various operations in a method of driving a display device, embodiments according to the present disclosure are not limited thereto, and according to various embodiments, the method may include additional operations or fewer operations without departing from the spirit and scope of embodiments according to the present disclosure.

Referring to FIGS. 6 and 16, in operation (S100), a touch approaching the touch array 130 may be sensed.

In operation (S200), beacon signals Beacon and uplink signals US1 may be generated. For example, data indicating the position of each touch electrode may be encoded to generate an encoded data signal US1. The encoded data signal US1 may further include information on the vertical synchronization signal Vsync, information on the panel 10, protocol version information, and the like. For example, panel information, information for drive synchronization between the external device 500 and the touch array 130, and the like may be encoded to generate the beacon signals Beacon.

In operation (S300), the beacon signals Beacon and the uplink signals US1 may be transmitted to the external device 500 through the sensing electrodes RX and the driving electrodes TX.

In operation (S400), the display device 1 may receive position information PI of the external device 500 above the touch array 130 calculated by the external device 500 in the form of a downlink signal.

According to some embodiments, the downlink signal may further include status information SI of the external device 500. For example, when the external device 500 is an active pen, the status information may further include button status information of the active pen, battery status information of the active pen, tilt information of the active pen when the active pen is in contact with the touch array 130, and the like.

In operation (S500), the display device 1 may decode a downlink signal DS2 to extract the position information PI of the external device 500. When the downlink signal DS2 further includes status information SI associated with the external device 500, the status information SI of the external device 500 may be further extracted by decoding. In addition, the extracted position information PI and status information SI may be transmitted to the host 60. According to some embodiments, the display device 1 and the host 60 may perform wired communication with each other. According to some embodiments, the display device 1 and the host 60 may perform wireless communication with each other.

Figure 17:
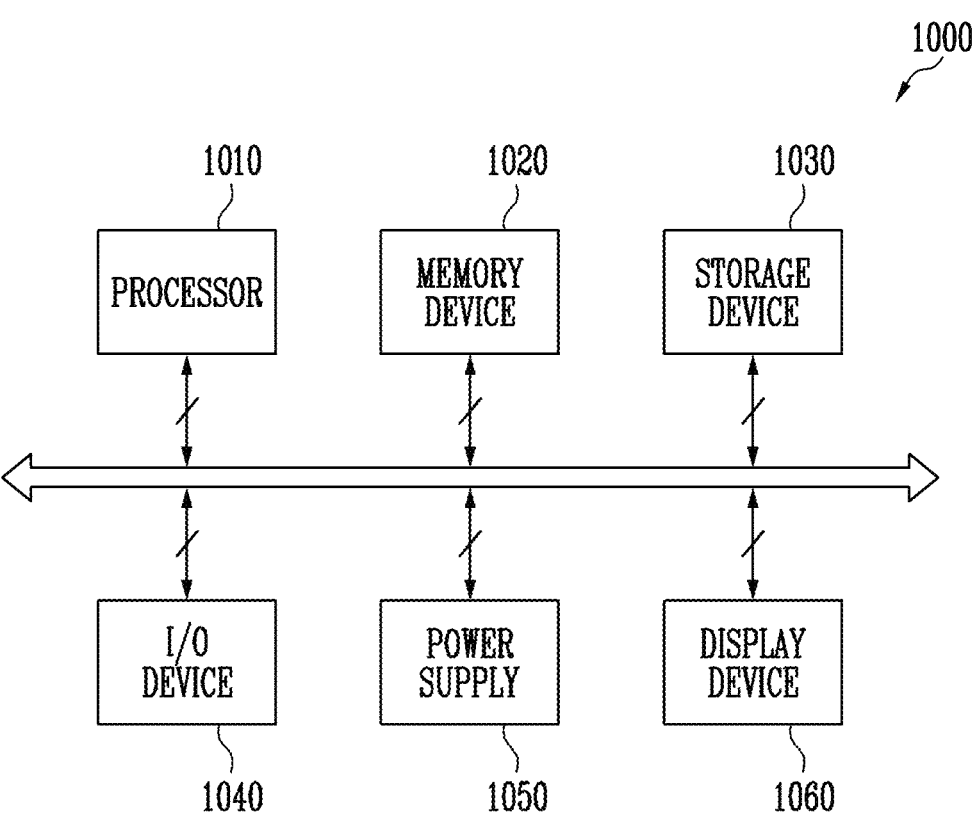
FIG. 17 is a schematic block diagram illustrating an electronic device including a display device in accordance with an embodiment.
Figure 18:
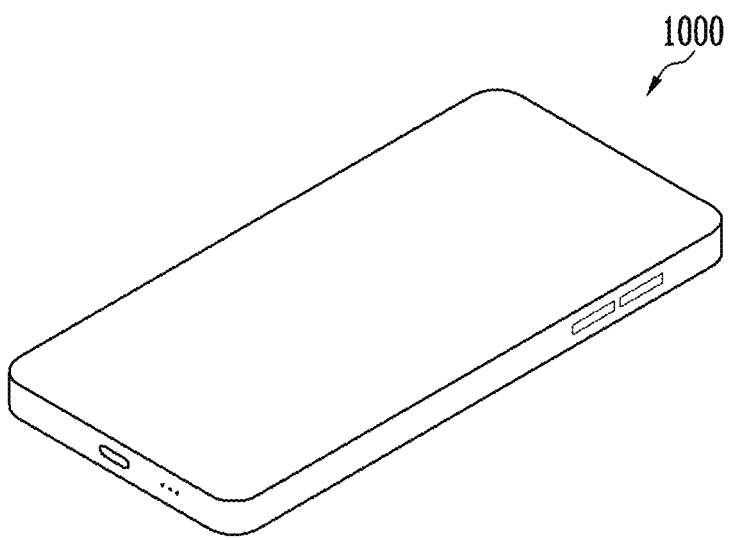
FIG. 18 is a schematic diagram illustrating an example where the electronic device of FIG. 17 is a smartphone.
Figure 19:
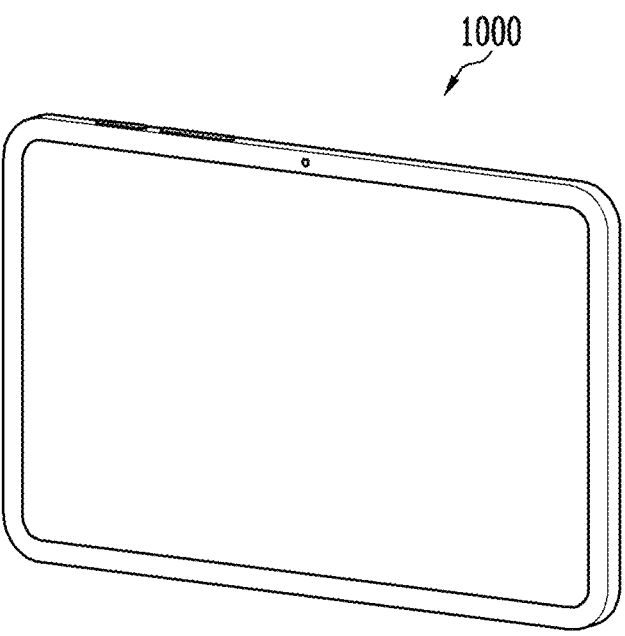
FIG. 19 is a schematic diagram illustrating an example where the electronic device of FIG. 17 is a tablet computer.

FIG. 17 is a schematic block diagram illustrating an electronic device 1000 including a display device in accordance with an embodiment. FIG. 18 is a schematic diagram illustrating an example where the electronic device 1000 of FIG. 17 is a smartphone. FIG. 19 is a schematic diagram illustrating an example where the electronic device 1000 of FIG. 17 is a tablet computer.

Referring to FIGS. 17 to 19, the electronic device 1000 may include a processor 1010, a memory device 1020, a storage device 1030, an input/output (I/O) device 1040, a power supply 1050, and a display device 1060. The display device 1060 may be the display device 1 of FIG. 1. The electronic device 1000 may further include various ports for communication with a video card, a sound card, a memory card, a USB device, or other systems. In an embodiment, as illustrated in FIG. 18, the electronic device 1000 may be a smartphone. In an embodiment, as illustrated in FIG. 19, the electronic device 1000 may be a tablet computer. However, the aforementioned examples are illustrative, and the electronic device 1000 is not necessarily limited to the aforementioned examples. For example, the electronic device 1000 may be a cellular phone, a video phone, a smart pad, a smartwatch, a navigation device for vehicles, a computer monitor, a laptop computer, a head-mounted display device, or the like.

The processor 1010 may perform specific calculations or tasks. In an embodiment, the processor 1010 may be a microprocessor, a central processing unit, an application processor, or the like. The processor 1010 may be connected to other components through an address bus, a control bus, a data bus, and the like. In an embodiment, the processor 1010 may be connected to an expansion bus such as a peripheral component interconnect (PCI) bus. In an embodiment, the processor 1010 may provide input image data to the display device 1060. Hence, the display device 1060 may display an image based on the input image data provided from the processor 1010.

The memory device 1020 may store data needed to perform the operation of the electronic device 1000. The memory device 1020 may function as a working memory and/or a buffer memory for the processor 1010. For example, the memory device 1020 may include one or more volatile memory devices such as a dynamic random access memory (DRAM) device, a static random access memory (SRAM) device, and a mobile DRAM device.

The storage device 1030 may store data in response to control signals or data from the processor 1010. The storage device 1030 may include one or more non-volatile storages to retain the data even when the electronic device 1000 is powered off. In some embodiments, the storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be integrated with the I/O device 1040.

The power supply 1050 may supply power needed to perform the operation of the electronic device 1000. For example, the power supply 1050 may include a power management integrated circuit (PMIC). In an embodiment, the power supply 1050 may supply power to the display device 1060.

The display device 1060 may display images in response to control signals or data from the processor 1010. The display device 1060 may be connected to other components through the buses or other communication links.

According to some embodiments of the present invention, a display device and a method of driving the same may be capable of efficiently and effectively obtaining position information of an external device positioned above a display.

Effects according to the embodiments are not limited to those described above, and various other effects are included in the present specification.

Although specific embodiments and implementations have been described herein, other embodiments and modifications may be derived from the foregoing descriptions. Accordingly, the spirit of the present disclosure is not limited to the foregoing embodiments, but may also be applied to the claims set forth below, various obvious modifications, and equivalents.

What is claimed is:

1. A display device comprising:
a touch array including a plurality of touch electrodes; and
a touch driver configured to sense a touch approaching the touch array,
wherein the touch driver is configured to generate uplink signals and beacon signals through at least some of the touch electrodes in a first time period, to transmit generated uplink signals and beacon signals to an external device, and to receive position information of the external device above the touch array, which is calculated by the external device, from the external device using the uplink signals in a second time period after the first time period, and
wherein a range of a run length of the uplink signals and a range of a run length of the beacon signals are distinct from each other,
wherein the touch driver is configured to apply the beacon signals of a same waveform to each of the touch electrodes and to apply the uplink signals of different waveforms to each of the touch electrodes.

2. The display device of claim 1, wherein the touch driver is configured to generate the uplink signals so that a maximum run length is N, and to generate the beacon signals so that the run length is N+1 or more, where N is an integer greater than or equal to 1.

3. The display device of claim 1, wherein in the first time period, the touch driver is configured to transmit the uplink signals to the external device after transmitting the beacon signals to the external device.

4. The display device of claim 1, wherein the uplink signals have an electrical pulse form including a digital component representing positional information of the touch electrodes.

5. The display device of claim 1, wherein the beacon signals have an electrical pulse form including panel information and information for drive synchronization between the touch array and the external device.

6. The display device of claim 1, wherein the touch driver is configured to receive the position information of the external device as a downlink signal through at least some of the touch electrodes, and to decode the downlink signal to generate the position information of the external device.

7. The display device of claim 6, wherein the external device is an active pen, and
wherein the downlink signal further includes at least one of button status information of the active pen, tilt information of the active pen, or battery status information of the active pen.

8. The display device of claim 1, wherein the touch driver is configured to communicate with a host, and
wherein the touch driver is configured to transmit the position information of the external device to the host.

9. A method of driving a display device including a touch array comprising:
sensing a touch approaching the touch array;
generating uplink signals and beacon signals in a first time period and transmitting generated uplink signals and beacon signals to an external device through touch electrodes of the touch array; and receiving position information of the external device above the touch array from the external device using the uplink signals in a second time period after the first time period, the position information of the external device being calculated by the external device, wherein a range of a run length of the uplink signals and a range of a run length of the beacon signals are distinct from each other, wherein in transmitting the generated uplink signals and beacon signals to the external device through the touch electrodes, the beacon signals of a same waveform are applied to each of the touch electrodes, and the uplink signals of different waveforms are applied to each of the touch electrodes.

10. The method of claim 9, wherein the uplink signals are generated so that a maximum run length is N, and the beacon signals are generated so that the run length is N+1 or more, where N is an integer greater than or equal to 1.

11. The method of claim 9, wherein in transmitting the generated uplink signals and beacon signals to the external device through the touch electrodes, after the beacon signals are transmitted to the external device, the uplink signals are transmitted to the external device.

12. The method of claim 9, wherein the uplink signals have an electrical pulse form including a digital component representing positional information of the touch electrodes.

13. The method of claim 9, wherein the beacon signals have an electrical pulse form including panel information and information for drive synchronization between the touch array and the external device.

14. The method of claim 9, wherein the receiving the position information includes:

receiving the position information of the external device as a downlink signal through at least some of the touch electrodes; and decoding the downlink signal to obtain the position information of the external device.

15. The method of claim 14, wherein the external device is an active pen, and wherein the downlink signal further includes at least one of button status information of the active pen, tilt information of the active pen, or battery status information of the active pen.

16. The method of claim 9, further comprising:

transmitting the position information of the external device to a host.

17. An electronic device, comprising:

a processor to provide input image data; and a display device to display an image based on the input image data, A display device comprising:

a touch array including a plurality of touch electrodes; and a touch driver configured to sense a touch approaching the touch array, wherein the touch driver is configured to generate uplink signals and beacon signals through at least some of the touch electrodes in a first time period, to transmit generated uplink signals and beacon signals to an external device, and to receive position information of the external device above the touch array, which is calculated by the external device, from the external device using the uplink signals in a second time period after the first time period, and wherein a range of a run length of the uplink signals and a range of a run length of the beacon signals are distinct from each other, wherein the touch driver is configured to apply the beacon signals of a same waveform to each of the touch electrodes and to apply the uplink signals of different waveforms to each of the touch electrodes.

* * * * *